(12) United States Patent
Uto et al.

(10) Patent No.: US 9,327,439 B2
(45) Date of Patent: May 3, 2016

(54) EXTRUSION DIE FOR LAMINATING FILM

(71) Applicant: TORAY INDUSTRIES, INC., Tokyo (JP)

(72) Inventors: Takayuki Uto, Otsu (JP); Syunichi Osada, Otsu (JP)

(73) Assignee: Toray Industries Inc., Tokyo (JP)

( * ) Notice: Subject to any disclaimer, the term of this patent is extended or adjusted under 35 U.S.C. 154(b) by 3 days.

(21) Appl. No.: 14/556,759

(22) Filed: Dec. 1, 2014

(65) Prior Publication Data

US 2015/0086671 A1   Mar. 26, 2015

Related U.S. Application Data

(62) Division of application No. 12/921,982, filed as application No. PCT/JP2009/053908 on Mar. 3, 2009, now Pat. No. 9,199,403.

(30) Foreign Application Priority Data

Mar. 14, 2008  (JP) .................................. 2008-065317

(51) Int. Cl.
| | |
|---|---|
| B29C 47/06 | (2006.01) |
| B29C 47/14 | (2006.01) |
| B29C 47/30 | (2006.01) |
| G02B 6/122 | (2006.01) |
| G02B 5/02 | (2006.01) |
| G02B 6/124 | (2006.01) |
| B29C 47/00 | (2006.01) |
| B29K 25/00 | (2006.01) |
| B29K 33/00 | (2006.01) |
| B29K 67/00 | (2006.01) |
| B29K 69/00 | (2006.01) |
| G02F 1/13363 | (2006.01) |

(52) U.S. Cl.
CPC ............. *B29C 47/30* (2013.01); *B29C 47/0021* (2013.01); *B29C 47/062* (2013.01); *B29C 47/065* (2013.01); *B29C 47/145* (2013.01); *G02B 5/0242* (2013.01); *G02B 6/124* (2013.01); *G02B 6/1221* (2013.01); *B29C 47/0019* (2013.01); *B29K 2025/00* (2013.01); *B29K 2033/12* (2013.01); *B29K 2067/043* (2013.01); *B29K 2067/046* (2013.01); *B29K 2069/00* (2013.01); *G02F 1/13363* (2013.01)

(58) Field of Classification Search
CPC ............ B29C 47/0019; B29C 47/0021; B29C 47/062; B29C 47/065; B29C 47/145; B29C 47/30

See application file for complete search history.

(56) References Cited

U.S. PATENT DOCUMENTS

| 3,274,646 | A | * | 9/1966 | Krystof ...................... 425/131.1 |
| 5,316,703 | A | * | 5/1994 | Schrenk ...................... 264/1.34 |

(Continued)

FOREIGN PATENT DOCUMENTS

| JP | 5133177 | 3/1976 |
| JP | 9300425 | 11/1997 |
| JP | 11179855 | 7/1999 |
| JP | 2000305073 | 11/2000 |
| JP | 2001091708 | 4/2001 |
| JP | 2006221145 | 8/2006 |

OTHER PUBLICATIONS

Extended European Search Report dated Nov. 5, 2014 for European application No. 09718701.7.

(Continued)

*Primary Examiner* — James Sanders
*Assistant Examiner* — Joseph Leyson
(74) *Attorney, Agent, or Firm* — RatnerPrestia

(57) ABSTRACT

An extrusion die for laminating at least two kinds of resins in the width direction is provided. The extrusion die has not less than 10 nozzles arranged in the width direction and not less than 10 holes such that the holes surround each of the arranged nozzles, or alternatively, the extrusion die has not less than 10 holes arranged in the width direction.

3 Claims, 12 Drawing Sheets

(56) References Cited

U.S. PATENT DOCUMENTS 6,057,961 A 5/2000 Allen
6,741,303 B1 5/2004 Okabe

OTHER PUBLICATIONS

Yang et al., "Circular-harmonic vector analysis of a dielectric waveguide with a cross-cut circular cross section," Applied Optics, vol. 34, No. 33 (1995), pp. 7705-7713.

Machine Translation of JP 11-179855, retrieved Feb. 9, 2013.
Machine Translation of JP2006-221145, retrieved Sep. 29, 2011.
International Search Report dated Jun. 9, 2009, application No. PCT/JP2009/053908.
Entire patent prosecution history of U.S. Appl. No. 12/921,982, filed Sep. 10, 2010, entitled, "Laminated Film."
Notice of Allowance mailed Jul. 29, 2015 in U.S. Appl. No. 12/921,982.

* cited by examiner

3

4

5

6

7

8

1
4

Thickness direction

Width direction

9

3

4

5

6

7

1
2

9

Thickness direction

Width direction

EXTRUSION DIE FOR LAMINATING FILM

CROSS-REFERENCE TO RELATED APPLICATIONS

This application is a is a divisional application of U.S. patent application Ser. No. 12/921,982, filed Sep. 10, 2010, which is the U.S. National Phase Application of PCT International Application No. PCT/JP2009/053908, filed Mar. 3, 2009, which claims priority to Japanese Patent Application No. 2008-065317, filed Mar. 14, 2008, the contents of each of these applications being incorporated by reference herein in their entirety.

TECHNICAL FIELD

The present invention relates to a laminated film and a film roll thereof. The present invention also relates to a film suitable for a light guide, a light diffusion film, a light-collecting film, a viewing angle control film, an optical waveguide film and the like, and to an illuminating device, a communication device, a display and the like using the same.

BACKGROUND OF THE INVENTION

A backlight display has become widespread in which a liquid crystal layer is illuminated from the backside to emit light. On the underside of the liquid crystal layer, a backlight unit is provided. The backlight unit is generally equipped with a bar-shaped lamp as a light source and a plurality of laminated optical sheets. Each of these optical sheets has specific optical characteristics such as refraction and diffusion. Specific examples of the optical sheet include: a square plate-shaped light guide plate whose end portion is arranged along a lamp; a light diffusion sheet provided on the surface of the light guide plate; a light-collecting sheet such as a prism sheet which is arranged on the surface of the diffusion sheet. Another type of the backlight unit is, for example, of a direct backlight type in which a lamp is located on the non-display side of a display and optical sheets are located between the lamp and the display.

A sheet (Patent Literature 1) has been recently proposed which has both functions of a diffusion sheet and a function of a light-collecting sheet, that is, has an enhanced changing a direction function of light without decreasing the amount of light emission in the normal direction. When such a sheet is employed, there are effects that the brightness of the display is increased and that the display is made thinner by reducing the number of the optical sheets in a backlight unit and by reducing the distance between the lamp and the display.

Such a sheet is proposed to be manufactured by a method in which two kinds of synthetic resins are multilayered in the width direction by a mixer. It is, however, not possible to obtain a sheet which has a large area and a uniform performance by this method. This is because disappearance of a layer, unification of layers or the like is caused by a considerable flow disturbance due to repeated deformations by a mixer or a deformation through an extrusion die when a very large number of layers each having a minute width are to be obtained by the mixer method.

Such a method of laminating sheets in the width direction by using a mixer is also disclosed, for example, in Patent Literature 2. Even in cases where the number of layers is small, deformation of the layers is inevitable, as shown in FIG. 1 and FIG. 2 of Patent Literature 2.

In addition, a method is proposed in which an optical interconnection is obtained by using a complex device having a large number of slits (Patent Literature 3). In this method, a width-direction multilayer laminated film with a higher precision compared with a film obtained by a method in which a mixer is employed, can be obtained; however, the upper limit of the substantial number of the layers aligned in a line is 301, the shape, position and cross section area of the core layer is hard to be stable due to the configuration of the die and therefore, and it was difficult to obtain a width direction multilayer laminated film having a large area.

Patent Literature 1: JP 2001-91708 A
Patent Literature 2: JP 51-33177 A
Patent Literature 3: JP 2006-221145 A

SUMMARY OF THE INVENTION

In view of the above-described problems associated with conventional techniques, the present invention provides a width-direction multilayer laminated film having a large area and uniform optical properties. The present invention also provides a light guide, a light diffusion film, a light-collecting film, a viewing angle control film, and an optical waveguide film, which are low cost and have excellent optical properties, and an illuminating device, a communication device and a display using these films.

The laminated film preferably has at least a structure in which a layer made of resin A (layer A) and a layer made of resin B (layer B) are alternately laminated in the width direction, wherein the width of the film is 400 mm or more and the number of layer Bs each having a cross-sectional width of 0.1 μm or more and 10,000 μm or less is 10 or more.

The laminated film of the present invention can be a width-direction multilayer laminated film having a large area and uniform optical properties. Since a width-direction multi-layer laminated film having a large area can be obtained, the film can be manufactured at very low cost. Further, in an embodiment of a film whose part of end portion is branched, it is easy to connect the film to an illuminating device.

DESCRIPTION OF SYMBOLS

Figure 1:
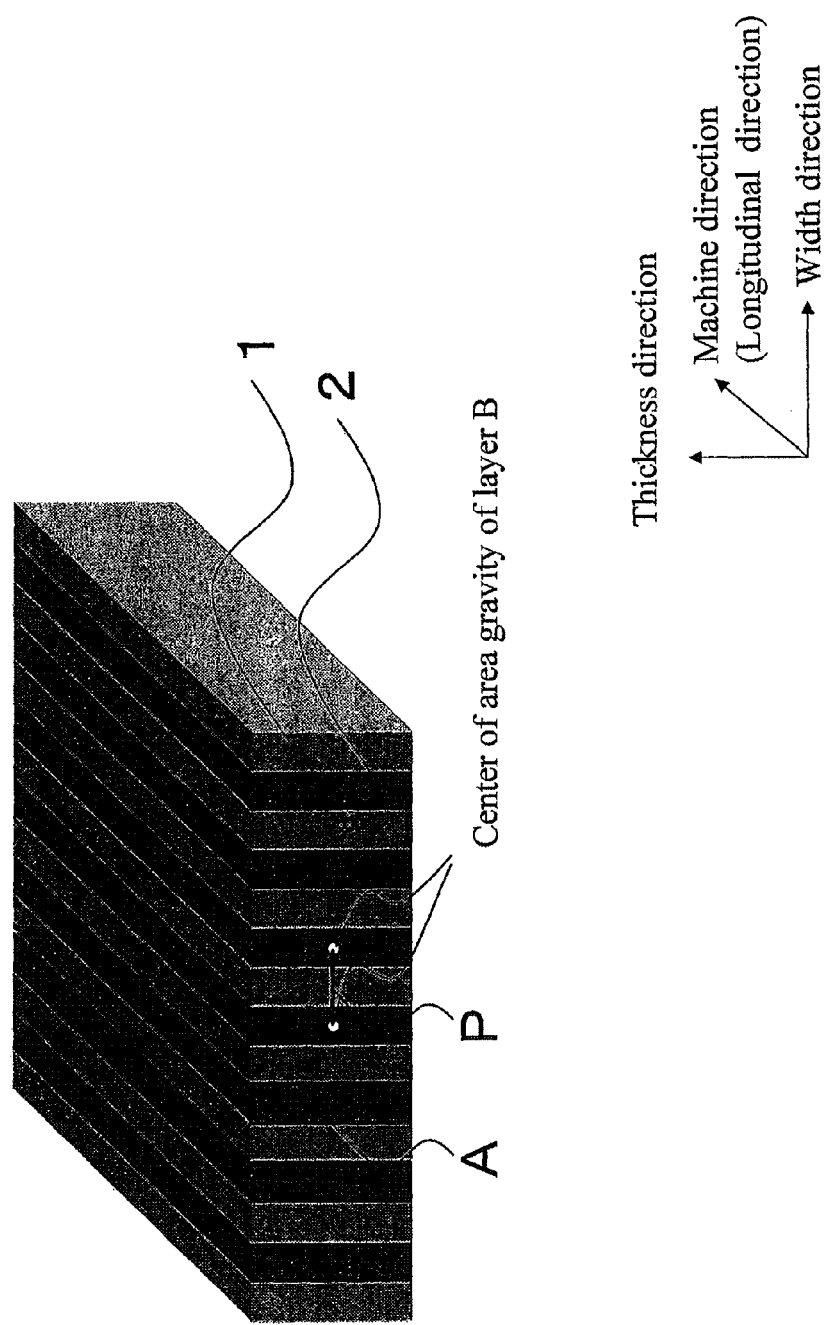
FIG. 1 is a perspective view illustrating an example of the laminated film of the present invention.

1: resin A
2: resin B
3: resin (polymer) inlet section
4: manifold section
5: first slit section
6: nozzle section
7: second manifold section
8: junction
9: second slit section
10: extrusion die
11: nozzle
12: junction
13: extrusion die
14: hole
21: extrusion die
22: guide port
23: guide port
24: flow path
25: manifold
26: multi-hole plate
27: hole
28: flow path
29: manifold
30: junction
31: lip

DETAILED DESCRIPTION OF THE INVENTION

It is preferred that a laminated film of the present invention have at least a structure in which the layer made of resin A (layer A) and the layer made of resin B (layer B) are alternately laminated in the width direction, wherein the width of the film is 400 mm or more and the number of layer Bs each having a cross-sectional area of 0.1 µm or more and 10,000 µm or less is 10 or larger. Such a laminated film has a large area and can attain uniform optical properties.

In the following description, the shape of layers A and B are described by using a cross-section taken along the film width direction and the film thickness direction, unless otherwise specifically noted.

Although the resin used for the laminated film of the present invention is not restricted, one which comprises a thermoplastic resin is particularly preferred. By using the resin which comprises a thermoplastic resin, laminated films can be easily obtained by co-extrusion molding method and, in addition, surface processing such as thermal imprint process can be easily applied to the laminated films obtained, thereby allowing for producing the desired laminated films at a low cost. Examples of the thermoplastic resin which can be used include polyolefin resins such as polyethylene, polypropylene, polystyrene, and polymethylpentene; alicyclic polyolefin resins; polyamide resins such as nylon 6 and nylon 66; aramid resins; polyester resins such as polyethylene terephthalate, polybutylene terephthalate, polypropylene terephthalate, polybutyl succinate and polyethylene-2,6-naphthalate; polycarbonate resins; polyarylate resins; polyacetal resins; polyphenylene sulfide resins; fluorocarbon resins such as tetrafluoroethylene resins, trifluoroethylene resins, chlorotrifluoroethylene resins, tetrafluoroethylene-hexafluoropropylene copolymer and vinylidene fluoride resins; acrylic resins such as PMMA; polyacetal resins; polyglycolic acid resins; and polylactic acid resins.

The resin may be one which comprises only one type of repeating unit, copolymer or a mixture of two or more resins. Further, to the resin, various additives such as an antioxidant, antistatic agent, nucleus agent, inorganic particles, organic particles, viscosity-reducing agent, thermal stabilizer, lubricant, infrared absorber, UV absorber and a doping agent for adjusting refractive index may be added.

In particular, since the laminated film preferably exhibits a high strength, heat resistance and transparency and to prevent propagation loss when the light is guided through the sheet, the film is preferred to be polycarbonate; polymethylmethacrylate; cyclic olefin copolymer which is a copolymer between norbornene and ethylene copolymerized by metallocene or a Ziegler-Natta catalyst; cyclic polyolefin obtained by ring-opening metathesis polymerization and hydrogenation of a norbornene-based monomer; polyimide resin; poly (4-methylpentene-1); polyethylene terephthalate; polystyrene; or fluorinated polymer. Further, to reduce the propagation loss, it is more preferable that the hydrogen atoms in the polymer be deuterated.

In the resin used for the laminated film of the present invention, resin A and/or resin B preferably contain particles having light diffusibility such as inorganic particles and organic particles. In this case where the resin A and/or resin B contain the particles having light diffusibility such as inorganic particles and organic particles, it is possible to impart a higher light diffusibility due to light scattering by the contained particles. Examples of such particles include alumina, aluminum hydroxide, magnesium hydroxide, talc, glass bead, sodium silicate, calcium carbonate, barium carbonate, titanium oxide, and silica. It is also preferred that, as resin A and/or resin B, one in which a resin different from the resin that is a major constituent of the resin A and/or B is dispersed be used. In particular, by dispersing the resin whose refractive index is different from that of the dispersed resin, light can be scattered using the light refraction and reflection which occur at the interface between resins, thereby allowing for impartation of high light diffusibility. In the present invention, such dispersed resin is also considered to be within the concept and meaning of a particle because it has the same effect as that of the particles described above.

In the laminated film of the present invention, it is preferable that particles are contained only in the layer B, and it is also preferable that particles are contained in both the layers A and B and an area fraction of the particles contained in the layer B (which refers to a ratio of the particle portion to the layer in a cross-sectional image) is larger than that of the particles contained in the layer A. In this case, diffusion of the light transmitting through the layer made of resin A (layer A) is larger than diffusion of the light transmitting through the layer made of resin B (layer B). Because of this difference in the light diffusibility, for example, in cases where the laminated film is used for suppressing ununiformity of the backlight brightness, by arranging the layer B above the lamps and the layer A between the lamps, the ununiformity in the brightness originating from the lamps can be suppressed effectively.

In the laminated film of this invention, it is also preferable that both the layers A and B contain particles and the particle diameter of the particles contained in the layer B is smaller than that of the particles contained in the layer A. The particle diameter as used herein indicates a particle diameter of an inorganic or organic particle, and a dispersion diameter of resin. If there is a variation in particle diameters and dispersion diameters, an average value is used. Also in this case, diffusion of the light transmitting through the layer made of resin A (layer A) is larger than diffusion of the light transmitting through the layer made of resin B (layer B). Because of this difference in the light diffusibility, for example, in cases where the laminated film is used for suppressing ununiformity of the backlight brightness, by arranging the layer B above the lamps and the layer A between the lamps, the ununiformity in the brightness originating from the lamps can be suppressed effectively.

Figure 2:
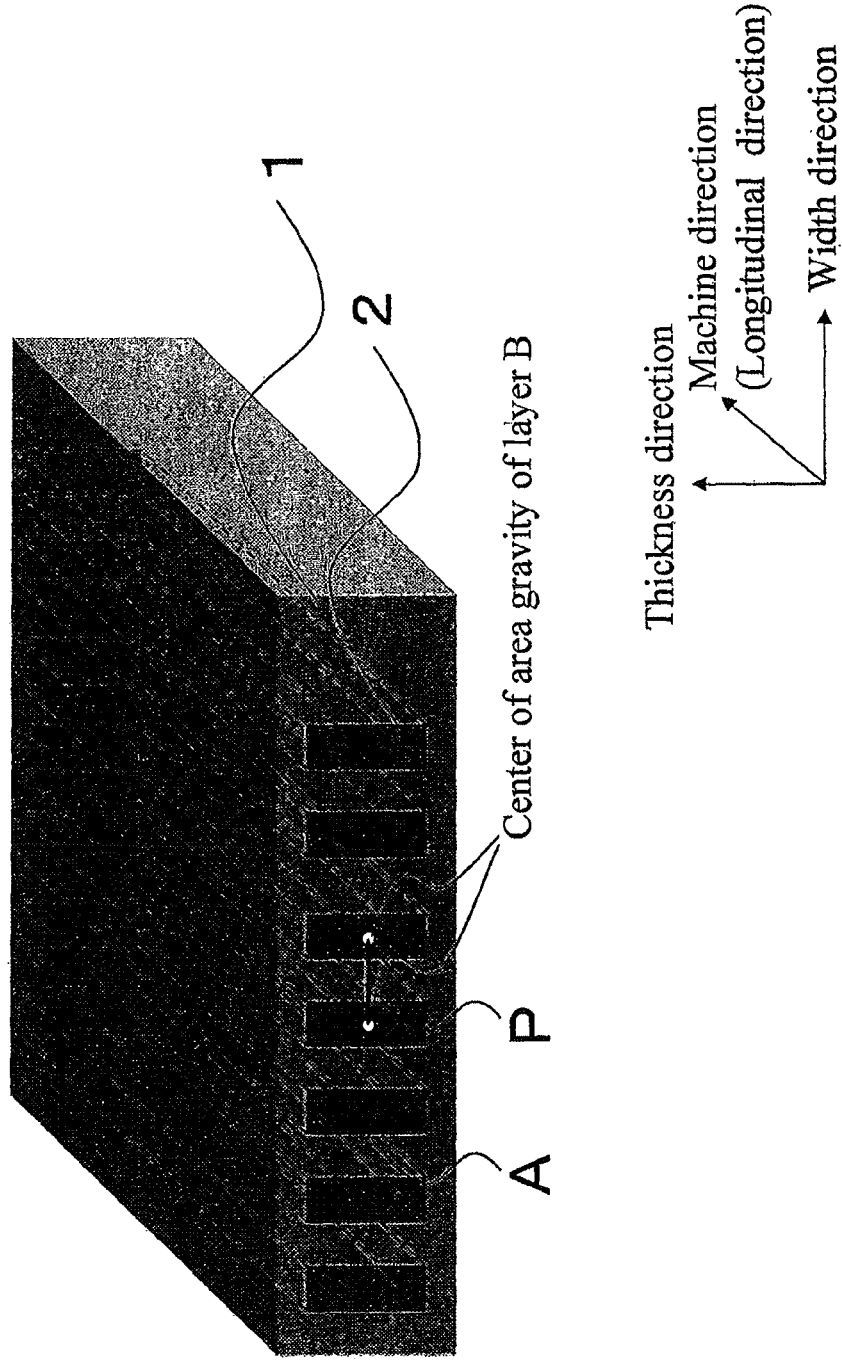
FIG. 2 is a perspective view illustrating an example of the laminated film of the present invention.

The laminated film of the present invention preferably has at least the structure in which the layer made of resin A (layer A) and the layer made of resin B (layer B) are alternately laminated in the width direction. The resin A and resin B are different resins or preferably have different types and amounts of contained additives. Further, as illustrated in FIGS. 1 and 2, the structure in which the layers are alternately laminated in the width direction is a structure in which at least the layers A and B are alternately arranged in the width direction in a partial region in the film as viewed in a film thickness direction-film width direction cross-sectional view. FIGS. 1 and 2 illustrate perspective views of examples of the laminated film according to embodiments of the present invention. It is not necessarily required that the width direction length (lengths) and the thickness direction length (lengths) of the layer A and/or layer B be the same. It is preferable that the layer A and/or layer B are substantially continuous in the vertical direction (longitudinal direction). In this case, since a film not changing the optical characteristics in the vertical direction can be obtained, ununiformity of the optical characteristics of a display mounted with the film can be suppressed. Since a sheet without ununiformity of the optical characteristics can be obtained simply by cutting a continuously manufactured film at a desired length, it also becomes possible to manufacture an optical sheet at a low cost.

The laminated film of the present invention is optionally characterized in that optical diffusion and optical collection can be given by using refraction and reflection at the interface between the alternately laminated layers A and B. Therefore, in the laminated film of the present invention, it is preferable that the refractive index difference, |nb−na|, is 0.001 or larger, where na is the refractive index of the resin A and nb is the refractive index of the resin B. The refractive indices of the resins A and B are the refractive indices of the resin constituting the layer A and B, respectively. If the layer contains a mixture of a plurality of resins and additives, it is assumed that the refractive index of the mixture is the refractive index of the resins A and resins B. With the refractive index difference between the resins A and B being 0.001 or larger, optical refraction and reflection occur at the interface, so that optical diffusion and collection can be exhibited. The degree of the difference in the refractive indices of the resins A and B can be set arbitrarily in accordance with the laminated structure of the layers A and B, and desired optical diffusion and collection. The refractive index difference is more preferably 0.010 or larger, still more preferably 0.030 or larger, and most preferably 0.06 or larger. As the refractive index difference becomes large, a range applied to optical sheet design can, be broadened such as a larger incidence angle for total reflection at an interface and larger refractive indices, and a variety of optical characteristics that may be given to the laminated film can be increased. A combination of preferable resins A and B providing a refractive index difference |nb−na| of 0.001 or larger may be selected arbitrary, for example, from the above-described resins.

The laminated film preferably has a film width of 400 mm or wider, and the number of layer Bs each preferably having a cross-sectional width from 0.1 µm to 10,000 µm be 10 or more. The cross-sectional width as used herein refers to the maximum length of each of the layer Bs in the width direction in the thickness direction-width direction cross-section of the laminated film. If the cross-sectional width of the layer B is narrower than 0.1 µm, the cross-sectional width of an optical sheet used for a display becomes smaller than the wavelength of light used for displaying, so that the refraction and reflection at the interface do not occur and target optical characteristics may not be obtained. Further, if the cross-sectional width of the layer B is wider than 10,000 µm, the layer B has a shape of an extremely flat plane and if the laminated film is mounted in a display, it becomes difficult to obtain a uniform brightness distribution on the screen. The lower limit of the layer B cross-sectional width is preferably 10 µm or larger, and the upper limit of the layer B cross-sectional width is preferably 1,600 µm or less. If the laminated film is mounted in a display such as a liquid crystal display, it is preferred that the cross-sectional width of the film matches each pixel size in order to suppress a brightness ununiformity among the pixels. The layer B cross-sectional width is preferably from 10 µm to 1,600 µm, because it is possible to obtain an optical sheet suitable for pixel sizes of displays including small-size displays used for a portable phone and the like, as well as large-size displays of a 100V type and the like. If the film width is narrower than 400 mm, the whole screen of a display having a size of a 32V type or larger in which a main and high-quality optical sheet is demanded may not be covered with one film, thereby requiring a plurality of sheets to be used. This is not preferable in that the manufacturing cost increases and the brightness ununiformity on the screen may be caused. The film width is more preferably 600 mm or wider, and still more preferably 1,200 mm or wider. If the film width is 600 mm or wider, the film can be mounted in a display of a 47V type, and if the film width is 1,200 mm or wider, the film can be mounted in a large liquid crystal display of a 90V type or the like. The number of layer Bs takes an important role in exhibiting optical diffusion and collection in an optical sheet. As the number of layer Bs increases, a finer optical design can be performed and a more uniform brightness distribution on a screen can be obtained when the optical sheet is mounted in a display. It is not preferred that the number of the layer Bs be less than 10 because not only the optical characteristics such as optical diffusion and collection are degraded, but also brightness ununiformity may be caused also when the optical sheet is mounted in a display. As long as the number of layer Bs is 10 or larger, optical diffusion can be given by based on the optical diffusion difference between the layers A and B. The number of layer Bs is preferably 500 or more so that optical diffusion and collection can be provided based on the refraction and reflection at the interface between the layers A and B. More preferably, the number of layer Bs having a cross-sectional width from 1 µm to 1,600 µm is 500 or larger.

In the laminated film of the present invention, it is preferable that, in the film width direction-thickness direction cross-section, the cross-sectional width of more than half of layer Bs is in a range of an average cross-sectional width of ±10 µm. More than half means a number in excess of a half of the number of layer Bs in the laminated film. If the cross-sectional width of the layer B varies from point to point, there may occur a variation in optical characteristics such as optical diffusion and collection, depending on the layout of other constituent elements of a display. However, with the cross-sectional width of more than half of layer Bs being in a range of the average cross-sectional width of ±10 µm, it becomes possible to suppress a variation in the brightness distribution on the screen. More preferably, the layer B whose cross-sectional width is in the range of the average cross-sectional width ±10 μm exist continuously in the width direction for 300 mm or more, in which case a display having no brightness ununiformity on the screen can be obtained also when the film is mounted in a display. Depending on the constitution of the display in which the film is mounted, it is also preferable that the cross-sectional width of layer Bs changes periodically. In cases where light sources are arranged at a constant interval in such a manner of backlights used for a liquid crystal display, it becomes possible to diffuse and condense the light from the lamps effectively by periodically changing the cross-sectional width of the layer Bs in accordance with the intervals between the lamps. Especially when the laminated film has a width of not less than 400 mm and 10 or more layers B each having a cross-sectional width from 0.1 μm to 10,000 μm, the distance between the adjacent layer Bs and the cross-sectional width of the layer A between the adjacent layer Bs are not limited specifically, and the necessary optical characteristics are determined in relation to the design of the peripheral components such as layout of the light sources of the display in which the film is mounted and the characteristics of other optical sheets. However, it is particularly preferable that the distance between the adjacent layer Bs is from 10 μm to 200 μm when considering each pixel size of the display. In this case, it is easy to suppress a variation in the optical characteristics among the pixels. The distance P between the adjacent layer Bs is the distance between the centers of the adjacent layer Bs in the film width direction. The center of each layer B is determined in the manner described in JPCA-PE02-05-02S (2007). In the present invention, the distance P refers to the center of area gravity of each layer B (a cross-sectional width of the layer A between the adjacent layer Bs is, as in the case of layer B, the maximum length of the layer A in the width direction in a thickness direction-width direction cross-section of the laminated film).

In the laminated film of the present invention, it is preferable that the layer Bs exist continuously for 300 mm or more in the width direction, wherein the distance P between the adjacent layer Bs at the center in the width direction is 0.90 times to 1.10 times as large as the distance Pc between the adjacent layer Bs at the center in the width direction. The distance between the adjacent layer Bs at the center in the width direction as used herein is the distance between the adjacent layer Bs across the center in the film width direction in the film width direction-thickness direction cross-section. A variation in the distance between the adjacent layers B considerably influences the optical characteristics. In this case, however, since the optical characteristics can be controlled at a high precision, it becomes possible to suppress a variation in the brightness distribution on the screen when the film is mounted in a display. It is more preferable that the distance P between the adjacent layers B is 0.95 times to 1.05 times as large as the distance Pc between the adjacent layers B at the center in the width direction. In this case, brightness difference does not occur at any position on the screen. In addition, it becomes possible to realize a large area screen and one film can be mounted in a display of 32V type, with the layer Bs existing continuously for not less than 300 mm in the width direction, wherein the distance P between the adjacent layer Bs is 0.90 times to 1.10 times as large as the distance Pc between the adjacent layer Bs at the center in the width direction. As compared with a display in which a plurality of width-direction multi-layered laminated films are used, it becomes possible to lower the manufacturing cost and suppress the brightness ununiformity on the screen of the display.

Further, depending on the structure of the display in which the film is mounted, it is also preferable that the distance between the centers of the adjacent layer Bs changes periodically in the film width direction-thickness direction cross-section. In cases where light sources are arranged at a constant interval in such a manner of backlights used for a liquid crystal display, it becomes possible to diffuse and condense the light from the lamps effectively by periodically changing the cross-sectional width of the layer Bs in accordance with the intervals between the lamps In the laminated film of the present invention, it is preferable that the thickness of the layer B is from 1 μm to 10,000 μm in the film width direction-thickness direction cross-section. The cross-sectional width of the layer B as used herein refers to the maximum length of the layer B in the thickness direction in the thickness direction-width direction cross-section of the laminated film. If the thickness of the layer B is thinner than 1 μm, since the interface area at which the light impinging on the optical sheet refracts and reflects is small, the optical diffusion and collection may hardly be exhibited. If the thickness of the layer B is greater than 10,000 μm, since the sheet becomes thick, handling performance may be degraded and the manufacturing cost of the sheet and display may be increased. Further, also when the film is mounted in a display, there is a drawback of, for example, an increased size of the display, which becomes problematic. When the thickness of the layer B is from 1 μm to 10,000 μm, it becomes possible to provide optical diffusion and collection while maintaining the handling performance. Particularly, when the laminated film is mounted in a display, the thickness of the layer B is preferably from 1 μm to 1,000 μm, and more preferably from 10 μm to 500 μm. In this case, the laminated film can be provided with optical characteristics which can sufficiently make the brightness distribution on the screen uniform when mounted on a display, and in addition, an optical sheet which is excellent in handling performance with flexibility and can be used in a variety of forms can be obtained.

In the laminated film of the present invention, the thickness of the layer B is also preferably 0.01 times to 0.5 times as large as the width of the layer B, in the film width direction-thickness direction cross section. In this case, it is possible to have a cross-sectional width capable of effectively suppressing a brightness variation of backlights and thinning the film. Preferably, the thickness of the layer B is 0.1 times to 0.25 times as large as the width of the layer B. In this case, it is possible to effectively uniformize all of the light beams radiated from the lamps.

In the laminated film of the present invention, as illustrated in FIG. 2, the layer B is also preferably covered with a resin (e.g., resin A) in the film width direction-thickness direction cross-section. The layer B covered with the resin corresponds to a state that the side surfaces of the layer B are not exposed except the exposed portion of the layer B in cases where the layer B is subjected to an exposure treatment at the end of the film. More than half of the layer Bs is preferably covered with the resin. With this structure, interlayer stripping at the interface between different resins becomes difficult to occur. Therefore, the optical characteristics such as optical diffusion and collection can be maintained even when the film is subjected to bending, stretching and/or impact during manufacture and use, so that a film having excellent durability can be obtained. More preferably, all layer Bs are covered with the resin, so that a change in the optical characteristics caused by bending, stretching or impact during manufacture and use can be almost suppressed.

In the laminated film of the present invention having the layer Bs covered with resin, the thickness of the resin covering the layer B is preferably from 5 μm to 1,000 μm in the film width direction-thickness direction cross-section. The thickness of the resin covering the layer B as used herein is the minimum value of the distance between the interface of each and the film surface in the thickness direction, and is preferably from 5 μm to 1,000 μm. The influence of bending, stretching or impact during manufacture and use can be alleviated by the resin covering the layer B, and this effect becomes prominent when the thickness of the resin covering the layer B is 5 μm or thicker. Further, if the thickness of the resin covering the layer B is 1,000 μm or thicker, the film flexibility may be degraded; however, by setting the thickness at 1,000 μm or thinner, it becomes possible to suppress degradation in the optical characteristics caused by bending, stretching and impact while maintaining a good flexibility, and the interface between the layers A and B actually related to the optical characteristics such as optical diffusion and collection is not influenced, so that excellent durability can be exhibited.

In the laminated film of the present invention, the film thickness is preferably from 1 μm to 1,000 μm. The film thickness as used herein is an average value of film thicknesses in the film width direction. If the film thickness is from 1 μm to 1,000 μm or thinner, the film has sufficient flexibility, so that not only the handling performance is excellent, but also the film can be installed on a flat surface as well as on a deflected surface; therefore, the method of using such film can be broadened in a variety of manners.

Depending on a display, a preferred film thickness is from 1,000 μm to 10,000 μm. In this case, it becomes possible to provide the laminated film with a function as a substrate to retain other optical sheets mounted in the display in the same manner as a conventional diffusion plate, in addition to the desired optical characteristics such optical diffusion and collection. Therefore, the structure of the display can be simplified, and thinning and weight reduction of the display and suppression of an increase in the manufacturing cost can be attained.

The shape of the layer B of the present invention is not limited specifically, and may be circle, ellipsoid, semicircle, and a polygon such as a triangle, a tetragon, a trapezoid, a parallelogram, a pentagon or a hexagon. According to the method described later, a variety of shapes of the layer B can be realized easily. Corners of such polygon are not required to be strict corners, but may also be curved corners. Particularly, in the laminated film of the present invention, the shape of the layer B is preferably asymmetric relative to the center axis of the layer B in the thickness direction in the film thickness direction-width direction cross-section. The center axis in the thickness direction as used herein is a straight line positioned at an equal distance from the apexes of the upper surface side and the lower surface side of the layer B cross-section in the thickness direction and at the same time, parallel to the film plane. In cases where the layer B is symmetric relative to the center axis in the thickness direction, the light impinging on the laminated film uniformly exhibits optical diffusion and collection in the film On the other hand, in cases where the shape of the layer B is asymmetric relative to the center axis in the thickness direction, since the optical path length and the incidence angle of the impinging light to the interface on each layer change with the light incidence position, it becomes possible to create a difference in the optical diffusion and collection between layers, thereby enabling to provide more uniform optical characteristics. In a preferred embodiment, the shape of the layer B is a triangle, a parallelogram, a trapezoid and a semicircle. In these shapes, the interface between the layers A and B is tilted in relation to the film surface and arranged in such a manner that the optical path length is changed with the light incidence position. Therefore, there is an increase in the ratio of the light, which changes its traveling direction upon refraction and reflection at the interface between the layers A and B, to the light impinging on the surface, as well as in the degree of optical diffusion in the optical path changes, thereby allowing the film to exhibit prominent optical diffusion and collection. In the laminated film of the present invention, it is also preferable that S1 is not greater than 0.8 times of S2, wherein S1 and S2 (S1<S2) are cross-sectional areas of the layer B halved by the center axis in the thickness direction. Compared to cases where the S1 is in the shape of, for example, a tetragon, a rectangle or a parallelogram, which is larger than 0.8 times of the S2, as the S1 has a shape having a more prominent asymmetricity relative to the center axis, such as a semicircle or a triangle, it becomes easier to increase the inclination degree of the layer B interface and give a difference in the optical path length of the light impinging the layer B, so that optical diffusion and collection can be improved further. One of the characteristics of the laminated film of the present invention resides in that the film can optionally be formed into a complicated shape unable to be formed by a copy method such as imprint and photolithography. Also, in the laminated film of the present invention, it is preferable to form irregularities on the film surface. In a general flat surface film, regardless of the position of the light impinging on the film surface, as long as the incidence angle is the same, all of the impinged lights are reflected at the air-film interface in the same manner and enter the film at a particular angle. In contrast, when the film surface is irregular, even if light is impinged on the film surface at the same incidence angle, the light enters the film at a different refraction angle since the inclination on the film surface varies with the position on the film. Similar to the incidence surface, light is output in various directions from the output surface because the inclination on the film bottom surface varies with its position. Therefore, the light impinged on an irregular film is output in various directions relative to the incidence angle, thereby allowing the film to exhibit a high optical diffusion and enabling to provide the film with a high optical diffusion when used as a diffusion film. Similarly, by controlling the irregular shape, the same effect as that of a lens can be given to the film, allowing the laminated film to have a high optical collection. Examples of the method of forming the irregular shape include an embossing process and an edging process of a laminated film.

In the laminated film of the present invention, it is preferable that one of the resins A and B is insoluble to a solvent to which the other is soluble. In such laminated film, the layers A and B can be separated or the layer A or B can be exposed by immersing the end portion of the film into a particular solvent. Therefore, when the laminated film is used as an optical sheet such as a diffusion film or a light collection film, an irregular surface can be formed easily by treating with a solvent, so that optical diffusion and collection performances can also be improved. In the present invention, being soluble to a solvent means a condition in which the weight of a solid resin, which is formed by immersing a resin in a solvent for one day at a temperature for carrying out a dissolution process and subsequently drying the resin thus obtained and collected from the solvent, becomes not more than 50% of the weight of the resin prior to the immersion in the solvent. Examples of a resin having a high solubility to a solvent and high transparency include acrylic resins and polystyrenes. By using a combination of these resins and a resin having an inferior solubility such as polyester or polycarbonate, it is possible to perform a separation process and surface treatment on the film using a solvent.

In cases where the laminated film of the present invention is manufactured by a continuous process, the laminated film can be provided in the form of a film roll. When the laminated film can be provided as a film roll, various processings of the film surface can be performed in a roll-to-roll manner, so that a surface-treated film can be manufactured at a lower cost.

In the film roll of the present invention, the winding hardness variation in the width direction is preferably from 0.0001 to 6. A hardness variation in the width direction refers to a difference between the maximum and minimum hardness values when the winding hardness is measured at five points in a film roll width of 400 mm. In the laminated film of the present invention, the surface irregularity caused by the width-direction multi-layered laminated structure is likely to be formed, and when such film is wound into a roll shape, there occurs a problem that a laminated film having defective flatness is likely to be formed because of the surface irregularity. However, if the winding hardness variation in the roll width direction is from 0.0001 to 6, it is possible to obtain a laminated film having excellent flatness. Examples of the method of setting the winding hardness variation in the roll width direction in a range from 0.0001 to 6 include a method of rolling a protective film while laminating the film.

The laminated film thus obtained can be used as a diffusion film and light-collecting film suitable for a display or the like, and the laminated film of the present invention can be utilized also for applications other than these, the details of which will be described below.

The laminated film of the present invention is suitable for use as a viewing angle control film. By using a resin with excellent translucency as the resin A and a resin with light-shielding property as the resin B, the light that impinges on the film perpendicularly to the surface is transmitted, but the light that impinges on the surface of the film at an angle smaller than a certain angle is absorbed by the B layer Bs and not transmitted. Therefore, by arranging the film at the surface of a display or the like, the viewing angle can be controlled. The embodiment preferable for use as a viewing angle control film will be especially described below with respect mainly to the differences from the above description.

In cases where the laminated film of the present invention is used as a viewing angle control film, in particular, the resin A and/or the resin B is preferably polyester resin in view of the price, heat resistance, transparency, and strength.

In cases where the laminated film of the present invention is used as a viewing angle control film, in particular, at least one of the layers preferably contains particles having light-shielding property. In this case, the light-shielding property can be given to one of the layers, thereby allowing for shielding of transmission of the light that impinges on the film at an angle not smaller than a certain angle. Examples of such particles include carbon black, iron black (triiron tetroxide), a black titanium pigment, and perylene pigment/dye. Carbon black is particularly preferable in view of the high dispersity in resins and high masking ability.

In cases where the laminated film of the present invention is used as a viewing angle control film, it controls the viewing angle by utilizing the light shading property of the layer B. Thus, in the laminated film of the present invention, the difference between the refractive index of the resin A (na) and that of the resin B (nb), |nb−na|, is preferably less than 0.002. With the refractive index difference between the resin A and the resin B of 0.002 or more, light refraction and reflection occur at the interface and images through the film can look distorted from some angles. Examples of the method of obtaining a refractive index difference |nb−na| less than 0.002 include a method in which the resin B that is substantially the same as the resin A is used as a repeating unit and particles having light-shielding property are added thereto.

The laminated film according to an exemplary embodiment of the present invention has a width of 400 mm or more and the number of layer Bs having a cross-sectional width of not less than 0.1 μm and not more than 10,000 μm is 10 or more; however, in particular, in cases where the laminated film of the present invention is used as a viewing angle control film, the cross-sectional width of the layer B is preferably not less than 1 μm and not more than 100 μm. If the cross-sectional width of the layer B is less than 1 μm, depending on the light-shading property of the resin B, the light that impinges on the layer B may not be completely absorbed and viewing angle control ability may not be fully exhibited. If the cross-sectional width of the layer B is more than 100 μm, the layer Bs may be clearly recognized also when the screen is viewed from the front, and it may not be suitable for being mounted on a display. If the cross-sectional width of the layer B is not less than 1 μm and not more than 100 μm, sufficient viewing angle control ability can be exhibited while maintaining good screen visibility from the front. If the width of the film is less than 400 mm, one film cannot cover the entire screen of a display with a size of 32V or more, in which viewing angle control films are mainly used, and it becomes necessary to use multiple films to be mounted. This may cause an increased manufacturing cost and ununiformity of the viewing angle control ability, which is not preferred.

In cases where the laminated film of the present invention is used as a viewing angle control film, in the film width direction-thickness direction cross-section, it is particularly preferred that the thickness of the layer B be not less than 1 μm and not more than 1,000 μm. If the thickness of the layer B is less than 1 μm, the area of the layer B by which the incident light is absorbed is so small that the controllable view angle may be small. If the thickness of the layer B is more than 1,000 μm, the thickened sheets may cause impaired handling property (e.g., it can be handled only in the form of a plate), an increased manufacturing cost of the sheets and the display on which the sheets to be mounted, and a problem of an increase in the size of the display when the sheets are mounted on the display. With the thickness of the layer B of not less than 1 μm and not more than 1,000 μm, the viewing angle control ability can be given while maintaining the ease of handling. A more preferred thickness of the layer B is not less than 10 μm and not more than 200 μm, in which case, when the sheet is mounted on the display, flexibility, improved ease of handling, and thinning and weight saving of the display can be achieved.

In cases where the laminated film of the present invention is used as a viewing angle control film, the distance between the adjacent layer Bs is determined based on the cross-sectional width of the layer B, the thickness of the layer B, and the desired viewing angle. However, to achieve simultaneously the viewing angle control ability and the visibility of a transmitted image viewed from the front, the ratio of the thickness of the layer B to the cross-sectional width of the layer B is preferably 1 or more. To maintain the screen visibility from the front, it is preferred that the distance between the adjacent layer Bs be large and the cross-sectional width of the layer B be small, on the other hand, larger thickness of the layer B can give high viewing angle control ability even if the distance between the layer Bs is increased. As long as the ratio of the thickness of the layer B to the cross-sectional width of the layer B is 1 or more, high view angle control ability can be given while maintaining the visibility from the front. The ratio of the thickness of the layer B to the cross-sectional width of the layer B is more preferably 5 or more, and still more preferably 10 or more. The shape of the layer B is preferably rectangle with the thickness direction as the long side.

In cases where the laminated film of the present invention is used as a viewing angle control film, the film thickness is preferably not less than 1 μm and not more than 1,000 μm. The film thickness as used herein refers to a mean value of the film thickness distribution in the width direction of the film. As long as the film thickness is not less than 1 μm and not more than 1,000 μm, the film will have flexibility sufficient for a film, so that not only an improved ease of handling is obtained, but also it can be placed on a curved portion as well as on a flat plane; therefore, its use can be diversified.

In cases where the laminated film of the present invention is used as a viewing angle control film, the film is particularly preferably a quadrangle such as a rectangle or trapezoid. Films of these shapes easily transmit the light from the front well and also can improve the property of shading the light that impinges on the film at a certain angle.

In cases where the laminated film of the present invention is used as a view angle control film, the film surface is preferably smooth. If the film surface is irregular, when the film is mounted on a display, it may be hard to recognize displayed images because the angle of refraction and reflection of the light that impinges on the film varies; however, if the film surface is smooth, the displayed images can be recognized well regardless of the position of the observer or the angle.

The laminated film of the present invention is suitable for use as an optical waveguide film. By using, as the resin B, a resin whose refractive index is higher than that of the resin A, light-guiding property can be given to the light that impinges on the layer B from a width direction-thickness direction cross-section by repeating total reflection at the interface between the layer A and the layer B.

The laminated film of the present invention is suitable as an optical module. The term "optical module" generally means an electric part which converts light to electricity and vice versa. For example, it is a system having a basic constitution of vertical cavity surface emitting laser (VCSEL) which is the side of transmitting light—optical waveguide film which is a polymer optical waveguide path—photodiode which receives light. More specifically, for example, it is a system in which this constitution is mounted in an optical-magnetic card, in an optical backplane for interconnecting devices, between memory CPUs, or on the package of a switch LSI.

The laminated film of the present invention is suitable for a light guide, an illumination apparatus, and a display using an illumination apparatus. The film may be used as a solar cell member, for example, by guiding light, with almost no attenuation even in a long-distance optical transmission thanks to its high optical waveguide property, to solar cells by interconnecting a core with a Fresnel lens and collecting solar light. By employing red, blue, yellow and green light as the source of the light to be guided, the film may be used for ornamental uses. Further, the film may be used as an illumination member by taking the light such as those from a halogen lamp, LED, sun light or the like, waveguiding the light to the desired site through the film, and radiating the light. Such illumination member may be widely used as an illumination member for LCD backlight, machines for moving such as an automobile, airplane and ship, and building materials for a residence, factory, office and the like, exerting effects such as an improved brightness and energy saving.

The laminated film of the present invention can be suitably used as a communication apparatus or an optical waveguide for short to middle/long distance communication such as inter-device communication or intra-device communication. In this case, it may also be preferably used for a light guide with a connector. As the standard of the connector, in view of the versatility of the multicore-type plastic, MT connector, MPO connector, MPX connector, PMT connector or the like is preferably used.

The embodiment preferable for use as an optical waveguide film will be especially described below with respect mainly to the differences from the above description.

In cases where the laminated film of the present invention is used as an optical waveguide film, since the film is required to exhibit a high strength, heat resistance, and transparency and to prevent propagation loss when the light is guided through the sheet, the film is preferred to be polycarbonate; polymethylmethacrylate; cyclic olefin copolymer which is a copolymer between norbornene and ethylene copolymerized by metallocene or a Ziegler-Natta catalyst; cyclic polyolefin obtained by ring-opening metathesis polymerization and hydrogenation of a norbornene-based monomer; polyimide resin; poly(4-methylpentene-1); polyethylene terephthalate; polystyrene; or fluorinated polymer. Further, to reduce the propagation loss, it is more preferred that the hydrogen atoms in the polymer be deuterated.

In cases where the laminated film of the present invention is used as an optical waveguide film, it is preferred that the refractive index of the resin B (nb) be higher than the refractive index of the resin A (na) and the difference between the refractive indices, nb−na, be 0.001 or more. With the refractive index of the resin B being higher than the refractive index of the resin A, light can be guided through the resin B; however, if the difference between the refractive indices, nb−na, is less than 0.001, the reflection at the interface between the resin A and the resin B becomes so weak that sufficient light-guiding property may not be given. In an optical waveguide film for communication uses, the difference between the refractive indices, nb−na, should be arbitrarily selected depending on the wavelength of the light, the connectors, the number of modes or the like. In cases where the film is used as an illumination member, the difference is preferably 0.010 or more, more preferably 0.030 or more, and most preferably 0.06 or more, and the light-guiding property improves as the difference between the refractive indices increases, allowing for light transmission with almost no attenuation of the light intensity.

The laminated film according to an embodiment of the present invention has a width of 400 mm or more and the number of layer Bs having a cross-sectional width of not less than 0.1 μm and not more than 10,000 μm is 10 or more. In particular, in cases where the film is used as an optical waveguide film, the cross-sectional width of the layer B is preferably not less than 10 μm and not more than 5,000 μm. In this case, the connection to peripheral equipment such as connectors becomes easy while maintaining sufficient light-guiding property. In cases where the optical waveguide film is used as illumination parts, it is preferred that the width of the film be 400 mm or more and the number of layer Bs be 10 or more, and more preferred is 500 or more. In this case, when used for communication uses, it can be used as multichannel wiring with a large capacity, and an enhanced convenience, e.g., cutting out only a required width from one film to use, is obtained.

In cases where the laminated film of the present invention is used for an optical waveguide film, in the film width direction-thickness direction cross-section, more than half of the layer Bs' cross-sectional widths are preferably in the range of the average cross-sectional width ±10 µm. If the cross-sectional width of the layer B varies from point to point, variation in the optical waveguide performance of each layer B may occur. However, if more than half of the layer Bs' cross-sectional widths are in the range of the average cross-sectional width ±10 µm, variation in the optical waveguide performance can be prevented. More preferably, the layer B whose cross-sectional width is in the range of the average cross-sectional width ±10 µm exist continuously in the width direction for 300 mm or more, in which case variation in the optical waveguide performance of almost all the layer Bs on the film can be prevented. In addition, the cross-sectional width of the layer B is associated with the luminescence intensity when the film is used as an illumination member; however, the continuous existence of the layer B whose cross-sectional width is in the range of the average cross-sectional width ±10 µm in the width direction for 300 mm or more allows for the uniformity of the luminescence intensity of the film in the width direction.

In cases where the laminated film of the present invention is used for an optical waveguide film, the distance between the adjacent layer Bs is preferably not less than 10 µm and not more than 2,000 µm, and especially preferably not less than 10 µm and not more than 500 µm. As the distance between the adjacent layer Bs decreases, multichannel can be achieved in a smaller area.

In cases where the laminated film of the present invention is used for an optical waveguide film, the layer Bs, wherein the distance between the adjacent layer Bs, P, is 0.90 times to 1.10 times as large as the distance between adjacent layer Bs at the center of the film in the width direction, Pc, preferably exist continuously in the width direction for 300 mm or more. Since the optical waveguide film is used in connection to connectors for the input/output of the light, the distance between the layer Bs used for optical waveguiding is preferably constant, and a wide variation in the distance between the adjacent layer Bs can make it impossible to connect the film to the connectors or control the input/output correctly. If the distance between the adjacent layer Bs, P, is 0.90 times to 1.10 times as large as the distance between the adjacent layer Bs at the center of the film in the width direction, Pc, the distance between the layer Bs can be maintained almost constant, thereby allowing for easy and normal connection to the connectors. In addition, when the film is used as an illumination apparatus, the distance between the adjacent layer Bs, P, is more preferably 0.95 times to 1.05 times as large as the distance between the adjacent layer Bs at the center of the film in the width direction, Pc, in which case the connection to the connectors can be performed with almost no problem. Further, if the layer Bs, wherein the distance between adjacent layer Bs, P, are 0.90 times to 1.10 times as large as the distance between adjacent layer Bs at the center of the film in the width direction, Pc, exist continuously in the width direction for 300 mm or more, a film having a larger area can be obtained. Furthermore, when the film is used as an illumination apparatus, variation in the distance between the adjacent layer Bs causes illuminance ununiformity in the irradiated light; however, if the layer Bs, wherein the distance between the adjacent layer Bs, P, is 0.90 times to 1.10 times as large as the distance between adjacent layer Bs at the center of the film in the width direction, Pc, exist continuously in the width direction for 300 mm or more, the illuminance in the width direction of the film can be uniformized.

In cases where the laminated film of the present invention is used for an optical waveguide film, in the film width direction-thickness direction cross-section, it is particularly preferred that the thickness of the layer B be not less than 10 µm and not more than 2,000 µm. If the thickness of the layer B is less than 10 µm, it may lead to poor introduction of light into the layer Bs and poor connectivity with connectors or the like. If the thickness of the layer B is more than 2,000 µm, thickened film may cause impaired handling property (e.g., it can be handled only in the form of a plate) to limit the use. If the thickness of the layer B is not less than 10 µm and not more than 2,000 µm, high optical waveguide performance and good connectivity with connectors or the like can be given while maintaining the ease of handling. For the same reason, the thickness of the film also is preferably not less than 10 µm and not more than 2,000 µm.

In cases where the laminated film of the present invention is used for an optical waveguide film, the layer B, wherein the cross-sectional area of the layer B in a width direction-thickness direction cross-section (cross-sectional area A) is 0.90 times to 1.10 times as large as the cross-sectional area of layer B located at the center of the film in the width direction (cross-sectional area Ac), is preferably continuously exist in the width direction for 300 mm or more. The cross-sectional area of the layer B has an effect on the optical waveguide performance; however, if the cross-sectional area A is 0.90 times to 1.10 times as large as the cross-sectional area Ac, variation in the optical waveguide performance of the layer B can be prevented. The cross-sectional area A is more preferably 0.95 times to 1.05 times as large as the cross-sectional area Ac, in which case the optical waveguide performance of each layer B is substantially uniform, and this is preferable for multichannel optical waveguide. In addition, the continuous existence of the layer B for 300 mm or more whose cross-sectional area A is 0.90 times to 1.10 times as large as the cross-sectional area Ac allows for the uniformity of the performance in almost all channels.

In cases where the laminated film of the present invention is used for an optical waveguide film, for a communication member, in view of the fact that mode dispersion and propagation loss depending on the core shape occur, a shape having a symmetry about the center of the core as high as possible is preferred, and the most preferred shape is circular. Desirable symmetry includes line symmetry and point symmetry. For illumination use, in view of increasing the luminescence area and making the brightness of the surface uniform, a shape which is flat in the width direction is preferred, and the most preferred shape is rectangle with the thickness direction as the long side.

In cases where the laminated film of the present invention is used for an optical waveguide film, it is also preferred that the layer B be covered with resin in a width direction-thickness direction cross-section. More than half of the layer Bs are preferably covered with resin. Such structure makes it unlikely for interlayer peeling at the interface between different resins to occur, and, in addition, can prevent light leakage from the layer B due to scratches on the surface of the layer B used for optical waveguiding, thereby providing a film that can maintain an optical waveguide performance and has an excellent durability. It is more preferred that all of the layer Bs be covered with resin, in which case a decrease in the optical waveguide performance can be substantially prevented. On the other hand, when the film is used as an illumination member, structure in which one side of the film is not covered with resin is also preferable. With the film being not covered on one side, light leaks from the uncovered side to allow for its use as plane illumination, and in addition, various necessary processings can be applied directly to the layer B, resulting in an improved processability.

In cases where the laminated film of the present invention is used for an optical waveguide film, a part of the end portions of the film is preferably branched. "End portions of the film are branched" means a state in which at least one end portion of the laminated film is branched in plurality. Examples of the method of branching include a method of branching mechanically by microslits or the like and a method of branching by dissolving with a solvent a part of the covering resin A and exposing a part of the layer B. If a part of the end portions of the film is branched, an easy connection to an individual light source arranged scatteredly, e.g., LED light source, or to a point light source with the branched film end portion in the form of a bundle can be achieved.

In cases where the laminated film of the present invention is used for an optical waveguide film, it is also preferred that irregularities be provided to the surface of the film. By providing the irregularities to the surface of the film, light can leak from the concave portions and the film can be used as a plane light source. More preferably, the irregularities reach the layer B, in which case the light can leak from the layer B more effectively and the brightness can be enhanced.

Next, description will be made of a preferred method of manufacturing the laminated film of the present invention. Two kinds of resins, resin A and resin B, are prepared in the form of a pellet; however, they are not necessarily in the form of a pellet. When a blend of a plurality of resins and additives is used as the resin A or resin B, it is preferable that a resin which is compounded by a biaxial extruder or the like in advance and pelleted is used. By using a pellet compounded beforehand, it is possible to obtain a film containing resins and additives uniformly dispersed. The pellet is dried in advance in hot blow or under vacuum if necessary to be thereafter supplied to an extruder. The resins heated and melted in the extruder are extruded at a constant amount by a gear pump or the like, and a filter or the like removes foreign matters, denatured resin or the like.

The resins fed from two or more extruders via different flow paths are then supplied to an extrusion die. Either a uniaxial extruder or a biaxial extruder may be used without any problem. Particularly, if a plurality of resins and additives blended together are used as the resin A and the resin B, such resins and additives can be dispersed uniformly by using a biaxial extruder. In this case, the screw structure becomes very important. For example, in alloying, Dulmadge-type screw and Muddox-type screw are preferable for a single screw, and a screw structure in which paddles are combined in such a way that an enhanced kneading power is obtained is preferable for a twin screw. On the other hand, when only one kind of thermoplastic resin is extruded from one extruder, since a foreign matter is generated which is a cause of a propagation loss when the kneading is too strong, a single screw extruder using a full flight screw is preferable. The L/D of the screw is preferably 28 or less, and more preferably 24 or less. The compression ratio of the screw is preferably 3 or less, and more preferably 2.5 or less. As a method of eliminating a foreign matter which causes propagation loss, a known technique such as vacuum vent extrusion or use of a filtration filter is effective. The pressure of the vacuum vent is preferably about 1 to 300 mmHg in terms of differential pressure. A high precision filtration can be performed by using a FSS (Fiber Sintered Stereo) leaf disc filter as the filtration filter during melt extrusion. It is preferable that filtering precision of the filter is changed as appropriate depending on how large or how much the foreign matters occur and depending on the filtration pressure based on the resin viscosity; however, it is preferred to use a filter having a filtering precision of 25 μm or less. It is more preferred to use a filter having a filtering precision of 10 μm or less, and it is still more preferred to use a filter having a filtering precision of 5 μm or less. At this time, in view of decreasing the leakage of resin, the resin pressure at the tip of the extruder is preferably 20 MPa or less, more preferably 10 MPa or less.

Figure 3:
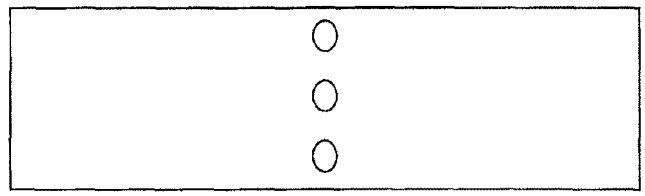
FIG. 3 illustrates plan views showing an example of the extrusion die of the present invention.
Figure 3:
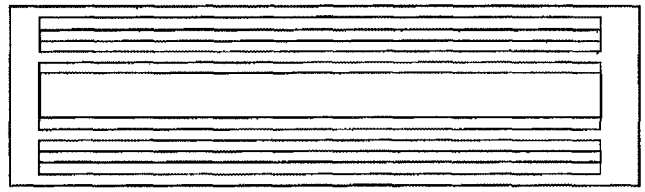
Figure 3:
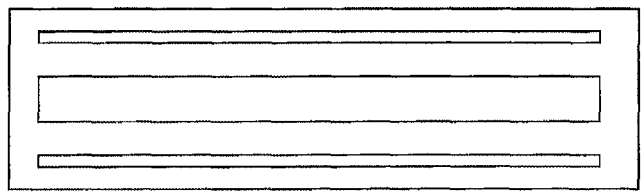
Figure 3:
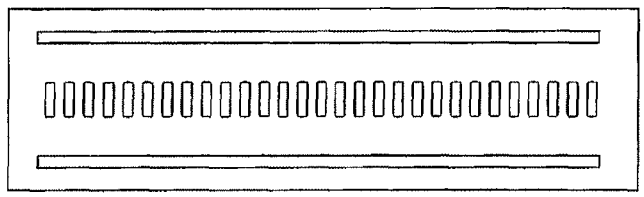
Figure 3:
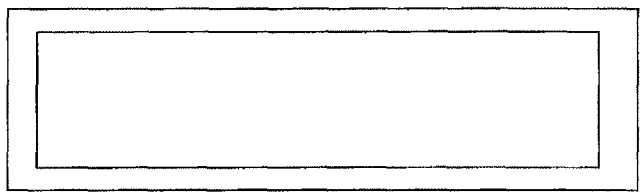
Figure 3:
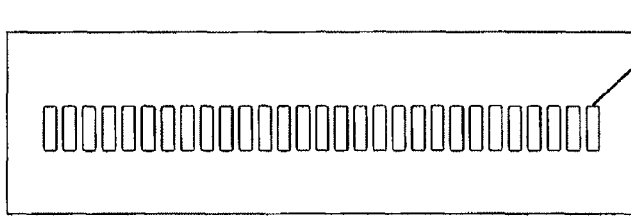
Figure 3:
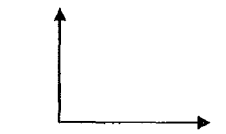
Figure 3:
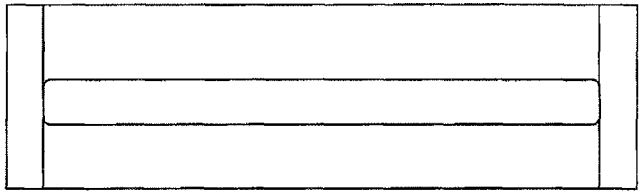
Figure 4:
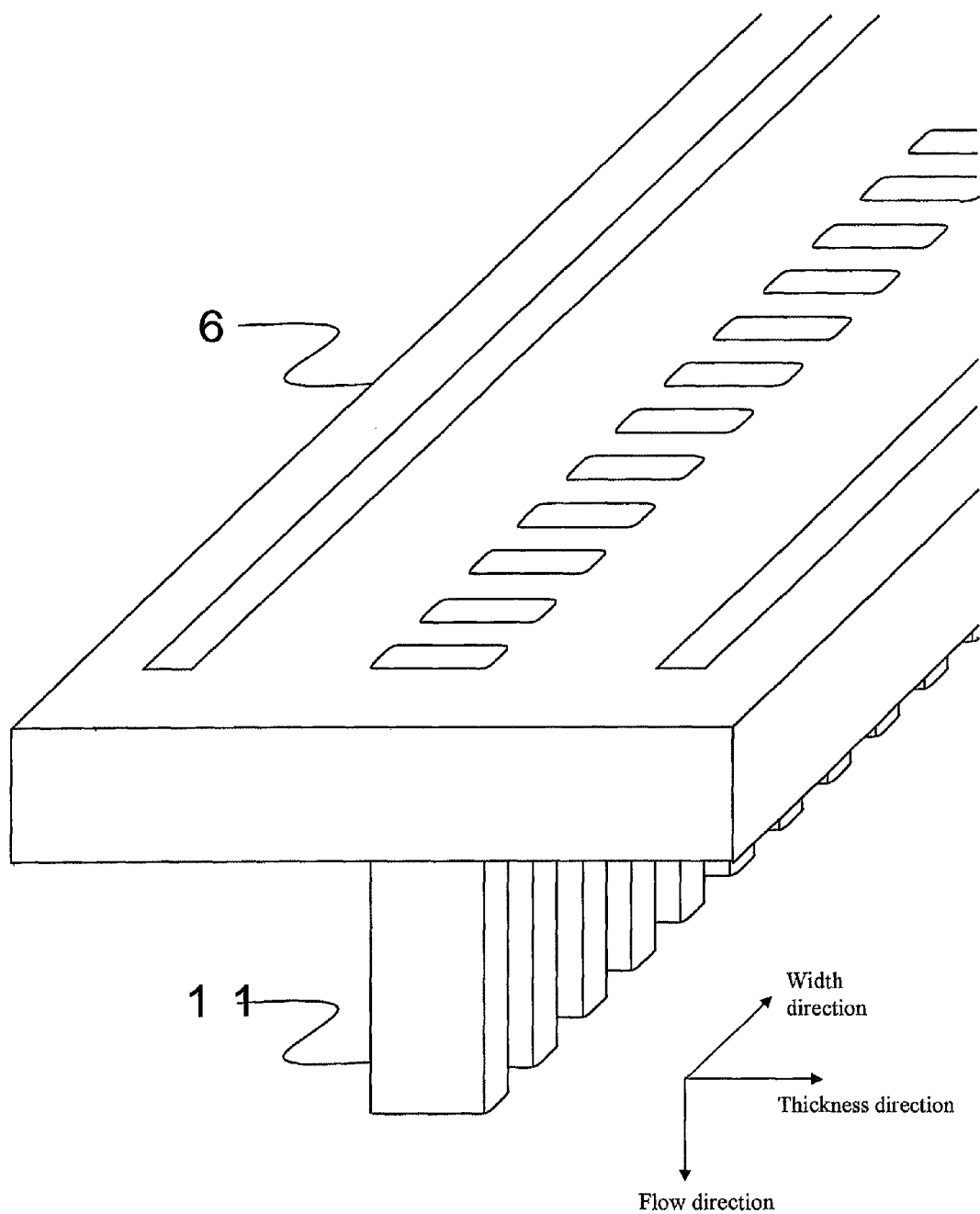
FIG. 4 is a perspective view of a nozzle section 6.
Figure 5:
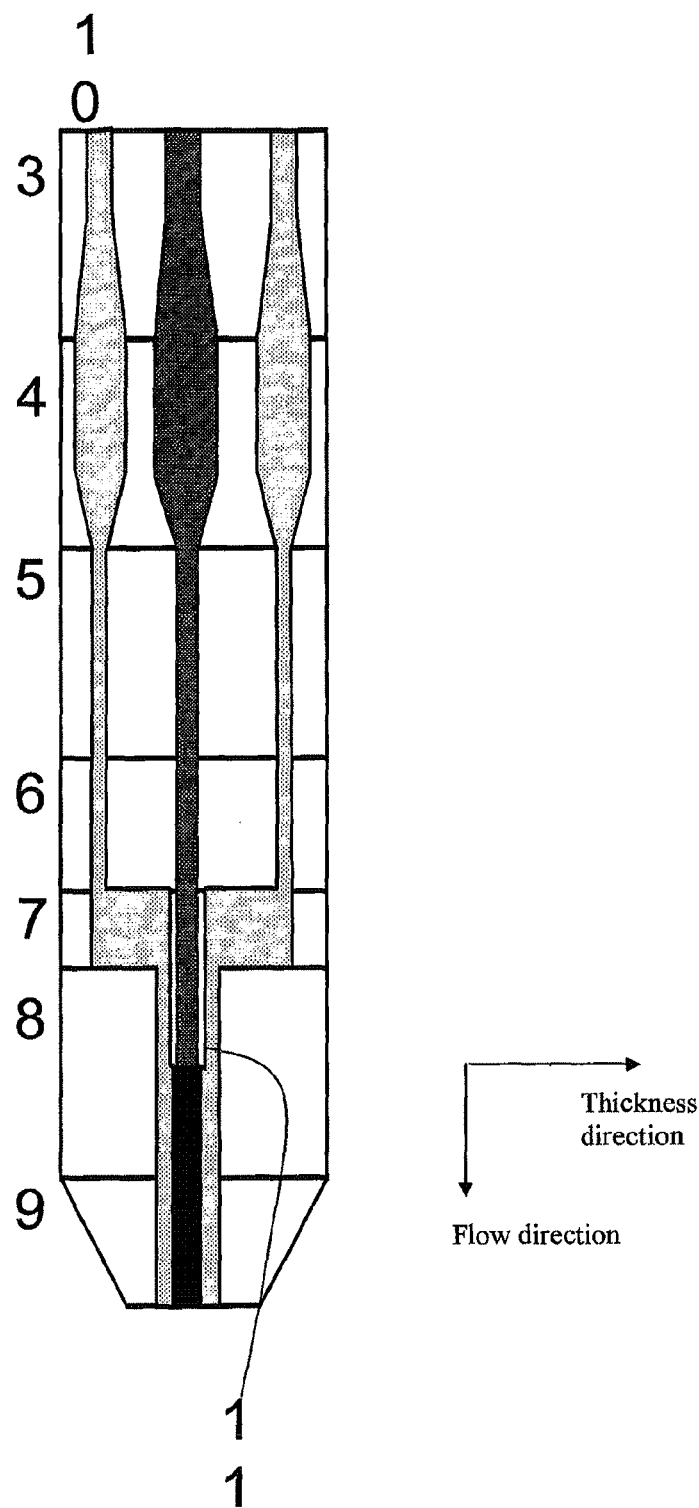
FIG. 5 is a cross-sectional view illustrating the internal structure of an example of the extrusion die of the present invention.

A preferable example of the extrusion die of the present invention is illustrated in FIGS. 3 to 5. FIG. 3 illustrates plan views of an example of the extrusion die of the present invention showing disassembled elements thereof viewed from the top surface side. FIG. 4 is a perspective view of an element 6. FIG. 5 is a cross-sectional view of an extrusion die 10 with integrated elements 3 to 9. The gray portion in FIG. 5 indicates a flow path of the resin A, and the black portion indicates a flow path of the resin B. By using such an extrusion die, it becomes easy to provide a width-direction multilayer laminated film having a large area and uniform optical properties.

Next, each component of the extrusion die will be described with reference to FIGS. 3 to 5. Reference numeral 3 represents a resin inlet section in which flowed resin A and resin B are expanded in the width direction. In FIG. 3, the upper and lower holes are inlet ports for the resin A, and the central hole is an inlet port for the resin B. The resin inlet section constitutes a portion of a manifold section. Reference numeral 4 represents the manifold section. Reference numeral 5 represents a first slit section whereat the flow paths are compressed in the width direction to uniformize the flow rate of the resin A and the resin B in the width direction. Reference numeral 6 represents a nozzle section having a structure in which a plate section for fractioning the resin B into each layer B and nozzles 11 are integrated. The nozzle 11 is a straight tube extending from the plate portion illustrated in FIG. 4 to the downstream side. The resin B is guided to a junction 8 via the nozzles, while the resin A flows through the slit section arranged above and under the nozzles. Reference numeral 7 represents a second manifold section whereat the resin As flowing separately in two flow paths are joined together. Reference numeral 8 is a junction having hole 14s into which the nozzles extend from the nozzle section 6. The size of the hole 14 is set larger than the outer shape of the nozzle section, so that resin A can flow through a space between the hole 14 and nozzle outer wall and, thereby allowing the resin A to cover or sandwich the resin B in the hole. Although not shown, a runner may be provided from the nozzle outer wall to hole inner wall for position alignment of the nozzle 11s in the hole 14. The nozzle 11 is preferably inserted to about a half of the junction 8. Reference numeral 9 represents a second slit section whereat the resin A and the resin B are joined together at each hole 14 into a sheet shape. It is preferable that the second slit section is constituted of two members or four or more members. A slight variation in gaps between slits may cause optical irregularity in the width direction in a large area; therefore the members of the second slit section is required to have a particularly high precision.

In order to obtain a target shape of the layer B, a design of the cross-sectional shape of the hole of the nozzle 11 is required to consider elongation deformation after ejection from the extrusion die. Since elongation deformation of a wide film elongates in the plane direction in many cases, a design is desired considering compression in the width direction is preferred. Namely, even if the cross-sectional shape of the hole of the nozzle 11 is set circular, a laminated layer ejected out of the extrusion die is expanded in the plane direction and compressed in the thickness direction, so that the layer B of the obtained film has an ellipsoidal shape having a longer axis in the width direction. If the shape of the layer B is desired to be circular, with consideration of elongation deformation after the ejection from the extrusion die, the hole of the nozzle 11 is preferably set to have an ellipsoidal shape having a longer axis in the thickness direction. This principle is obviously applicable not only to the case of a circular cross-section of the layer B, but also any shape of the layer B.

Various shapes are applicable to the cross-sectional shape of the hole of the nozzle 11, including circular, ellipsoidal, and semi-circular shapes, and polygonal shapes such as triangular, tetragonal, trapezoidal, pentagonal and hexagonal shapes. The extrusion die to be used particularly for forming a laminated film of the present invention has preferably a nozzle asymmetrical to the center axis in the width direction. The center axis in the width direction used herein refers to a straight line which is parallel to the alignment direction of the hole 14s and is positioned at an equi-distance from the apexes of the upper and lower sides of each nozzle in the width direction. By using such nozzle, it becomes possible to obtain a laminated film whose layer B is asymmetrical to the center axis in the width direction. A shape such as a tetragonal shape having a very long side may also be formed by arranging circular and tetragonal nozzles adjacent to each other to join resins B together at the junction. If such an extrusion die is used, the number of layer Bs can be adjusted by the number of nozzles. Further, the cross-sectional width of the layer B can be adjusted by a nozzle shape and an ejection amount.

It is preferable that the nozzle 11s are arranged in the width direction and that the nozzles are provided at the nozzle section 6 in a number as many as or more than the number of layer Bs of a desired laminated film. By assigning one nozzle to each layer B, it becomes possible to manufacture the layer Bs having a cross-sectional shape controlled highly precisely in a number as many as the number of nozzles, and to obtain a laminated film having a large area and uniform optical properties. The number of the nozzles is preferably 10 or larger in the width direction, more preferably 250 or larger, still more preferably 500 or larger, and still more preferably 1,000 or larger.

In addition to such layout of the nozzles arranged in one row in the width direction, a layout having a plurality of rows also in the film thickness direction is applicable as well. In the latter case, a plurality of rows of the layer Bs can also be laminated in the thickness direction of the thus obtained laminated film. Since a variety of optical designs are possible, it becomes possible to further improve the optical properties.

It is advantageous to uniformize the flow rates of the resin Bs flowed out from each of the nozzle 11s in order to obtain a width-direction multilayer laminated film having uniform optical properties. The flow rate of the resin B flowed out of each nozzle 11 is proportional to a pressure drop of fluid in the nozzle 11 defined by the nozzle diameter and the nozzle length. For the extrusion die of the present invention, therefore, it is preferable that the diameters and lengths of all nozzle 11s are uniformized in order to suppress a variation in the cross-sectional areas and shapes. Further, if a viscosity change associated with the share rate is large, a difference becomes small between a pressure drop in a nozzle having a higher share rate compared to other flow paths and a pressure drop in the second slit section and other flow paths, and the flow rate of the resin B from the nozzle may be reduced at the opposite end portions in the width direction. In this case, by increasing the diameters of the nozzles at the opposite end portions to slightly larger than those of the nozzles positioned in the central area in the width direction, the flow rates of the resin Bs from the nozzles can be uniformized. In this manner, by uniformizing the flow rates of the resins Bs from the nozzles, also in the obtained laminated film, it becomes easy to attain uniform cross-sectional area and shapes of layer Bs.

It is also advantageous to uniformize the flow rates in the width direction at the first slit section. By uniformizing the flow rates of the resin Bs in the width direction at the first slit section, the flow rates of the resin Bs to the nozzles arranged in the width direction are further uniformized and it becomes easy to obtain a film having uniform cross-sectional widths of the layer Bs in the obtained laminated film as well. Therefore, in the extrusion die of the present invention, it is preferable to provide a manifold on the upstream side of the first slit section.

Each of the nozzle 11s arranged in the width direction extends into the hole 14. By having such constitution, it is possible to guide the resin A in such a manner to surround the resin B in each hole, thereby enabling to attain a high lamination precision by laminating lamination flows in the same number as the number of nozzles. Consequently, it becomes possible to obtain a laminated film having a large area and uniform optical properties. The distal end of the nozzle 11 on the side of the junction 8 extends preferably only to an upstream position of the outlet of the hole at the junction 8. In this case, the resin B flowed out of the nozzle 11 is laminated with the resin A in the hole 14, and thereafter the flow can be stabilized in the hole 14; therefore, a change in the cross-sectional shape of the resin B flowed out of the nozzle 11 can be suppressed to a minimum.

By using the nozzle 11 surrounded by the hole 14s in this manner, the layer Bs flow to the junction in the form covered with the layer A. It becomes therefore possible to easily laminate the layer Bs in a desired number of layers. In addition, by controlling the flow rates of the layers A and B, it becomes possible to form films having a variety of cross-sectional shapes even with a single extrusion die.

When a plurality of nozzles are used in order to obtain a shape such as a tetragonal shape having a very long side, it is also preferable to insert a plurality of nozzles into one fine hole 14. In this case, by allowing the resin Bs flowed out of a plurality of nozzles to be joined in the hole 14 and formed into a shape of a layer, it becomes easier to obtain a desired shape at a high precision.

In order to maintain the shape of the layer B at constant, it is advantageous that the flow rates of the resin As flowed out of the hole 14 are also uniform in the width direction. There is a possibility that the shape of the layer B flowed out of the nozzle 11 is deformed by the flow of the resin A in the hole 14. It is therefore preferable that the diameters and lengths of the hole 14s are also made uniform, because the flow rate is controlled by the diameter and length of the hole 14 in the same manner as in the case of the nozzle.

Although the cross-sectional shape of the hole 14 may also take a variety of shapes, a particularly preferable shape is tetragonal. In this case, it becomes possible to suppress a change in a fluid flow to a minimum when the resins flowed from the nozzles are joined, thereby enabling to maintain the shape of the layer B which is the same as the nozzle shape. Meanwhile, it is also preferable that the shape of the hole 14 is analogous to the nozzle shape. In this case, it becomes possible to suppress a change in the cross-sectional shape of the resin B to a minimum when the resin B flowed out of the nozzle is laminated with the resin A in the hole 14.

Further, the hole 14 is preferably asymmetrical relative to the center axis in the thickness direction. The center axis in the thickness direction used herein refers to a straight line which is parallel to the alignment direction of the hole 14s and is positioned at an equi-distance from the apexes of the upper and lower sides of each nozzle in the width direction. By using such holes, the resin extruded from the nozzle can be easily deformed into an asymmetrical shape relative to the center axis in the thickness direction, so that a laminated film having the layer B asymmetrical to the center axis in the thickness direction can be obtained. In order to obtain a width-direction multi-layered laminated film of a large area having uniform characteristics, it is important not to perform width expansion and compression in the path from the junction 8 to the second slit section 9, as much as possible. By applying the width expansion and compression in the flow path after the junction, the flow rate distribution changes due to deformation of the flow path, and the shape of the laminated flow obtained by laminating resins exactly following the design is deformed. As a result, the obtained laminated film also has a cross-sectional shape different from the designed shape, so that the desired characteristics may not be obtained and the characteristics in the width direction may be changed. If it is necessary to perform width expansion and compression, the laminated flow is preferably deformed in an analogous manner. The analogous manner used herein refers to a deformation in such a manner that the same ratio between the width direction length and the thickness length is maintained. In cases where the flow path is deformed in such analogous manner, although the flow rate in the flow path changes, since the flow rate changes in the flow path at a uniform ratio, the shape of the laminated flow laminated at the junction becomes not likely to be changed.

It is also preferable that the flow path length from the junction 8 to the outlet of the second slit section 9 is made as short as possible. As the flow path length after the junction becomes longer, the lamination structure of the laminated flow laminated at the junction may become more likely to be disturbed and the lamination structure having a desired cross-sectional shape may become more difficult to be obtained.

Figure 6:
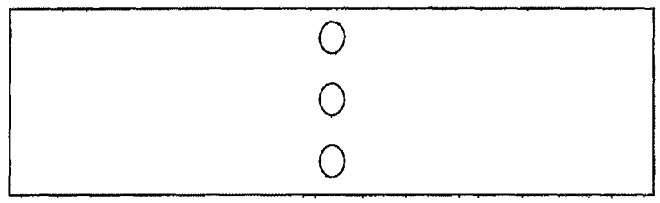
FIG. 6 illustrates plan views showing an example of the extrusion die of another embodiment of the present invention different from that illustrated in FIG. 3.
Figure 6:
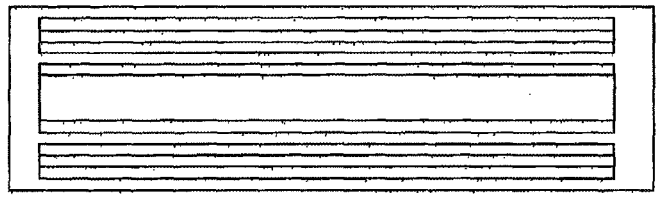
Figure 6:
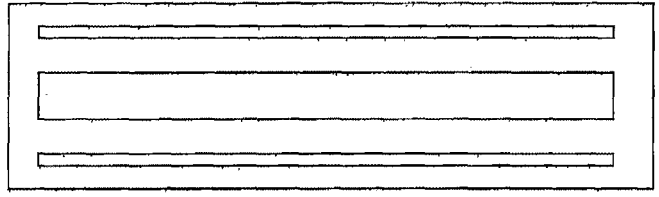
Figure 6:
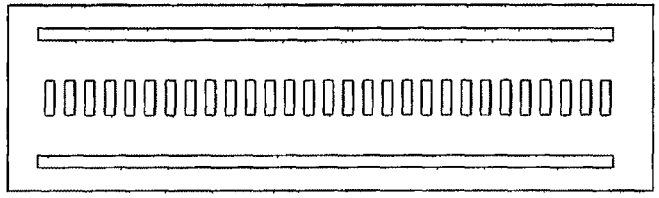
Figure 6:
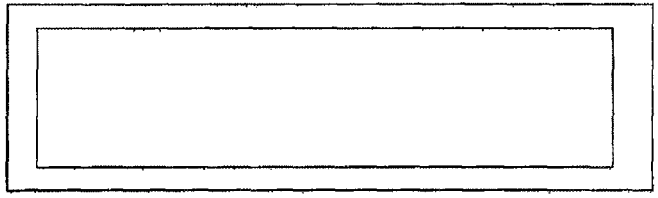
Figure 6:
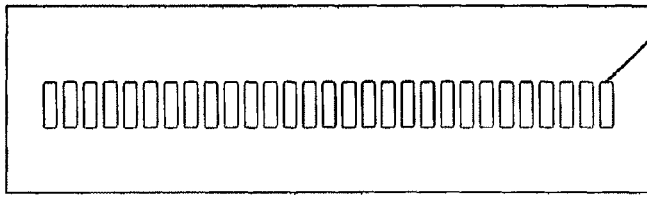
Figure 6:
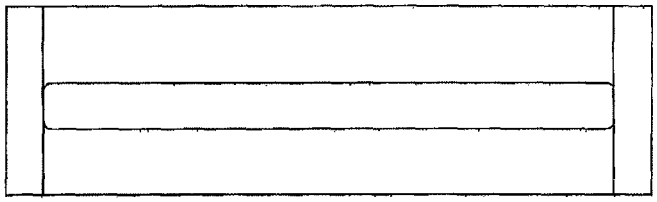
Figure 7:
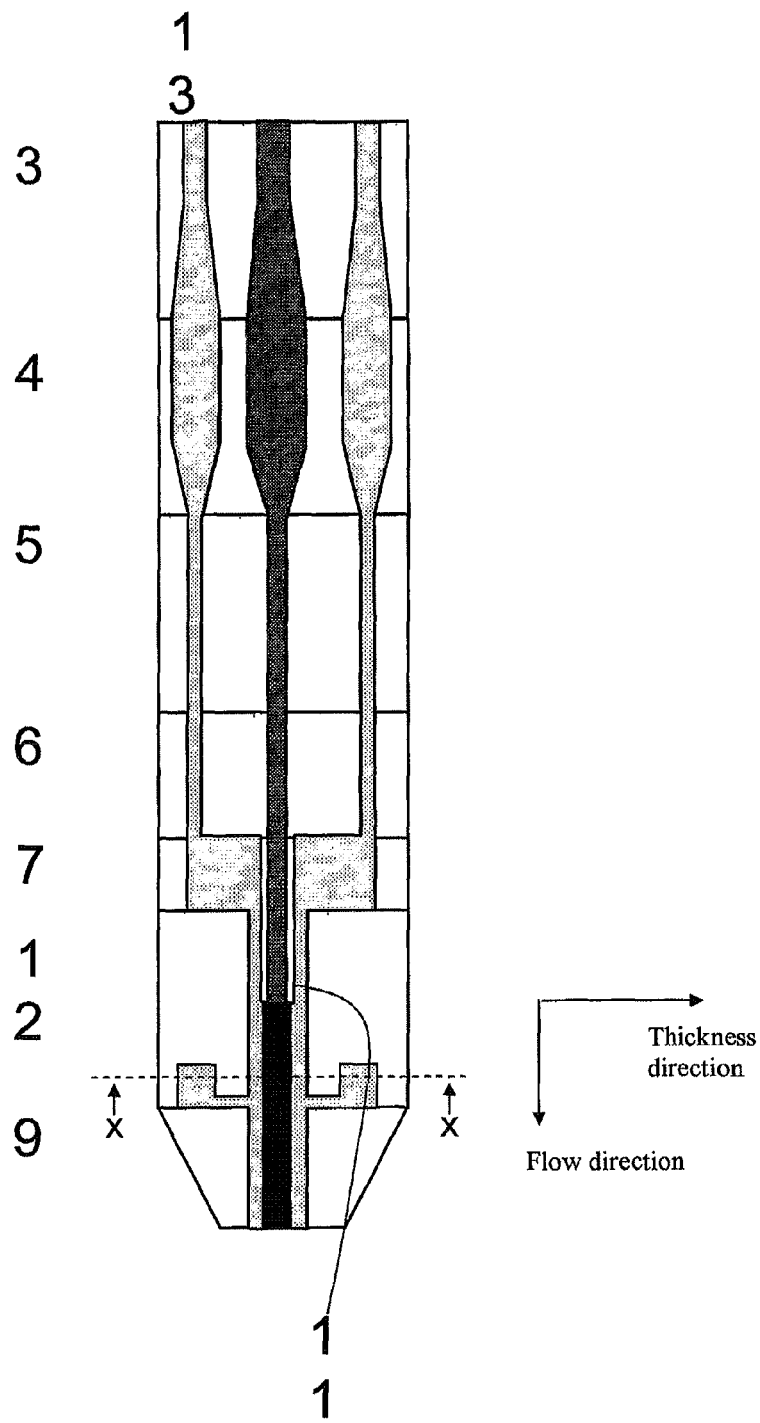
FIG. 7 is a cross-sectional view illustrating the internal structure of an example of the extrusion die according to another embodiment of the present invention different from that illustrated in FIG. 5.
Figure 8:
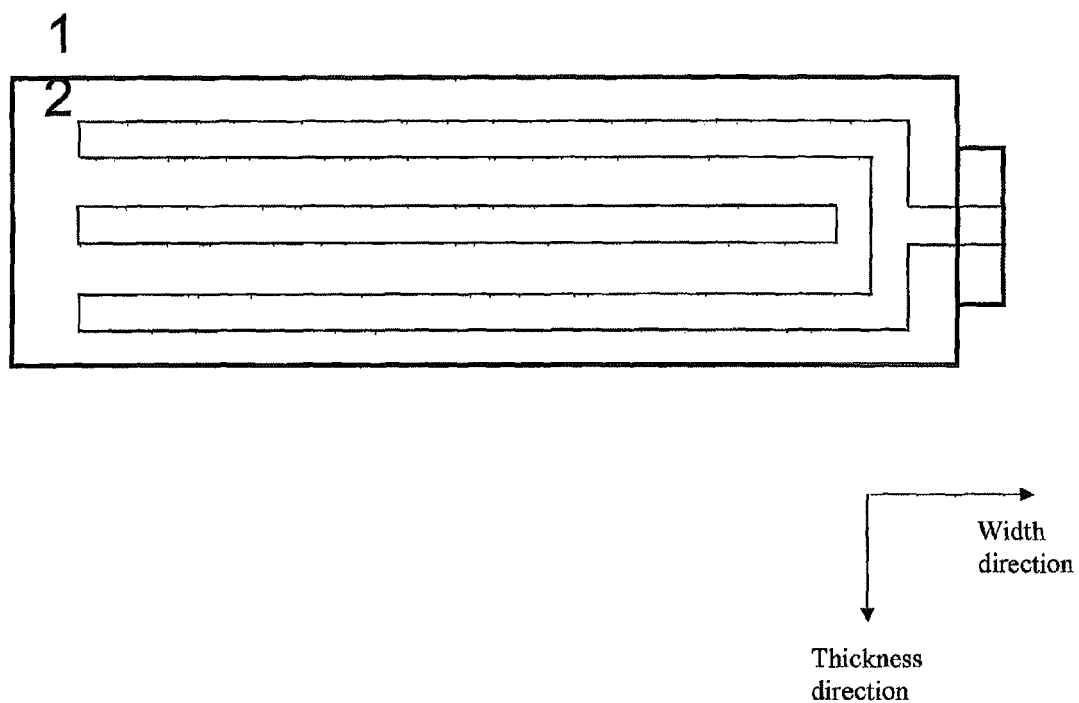
FIG. 8 is a cross-sectional view illustrating the internal structure of an example of the extrusion die of the present invention, taken along the line X-X in FIG. 7.

As a technique to improve the lamination accuracy of the layers A and B at the junction 8 and to allow the range of the shapes applicable in lamination to be broadened, it is also preferable that a flow path (flow path C) is provided separately for supplying the resins to both walls of the second slit section 9 in the thickness direction. FIGS. 6 to 8 illustrate an example of an extrusion die having such flow path described above. FIG. 5 is a plan view of an example of the extrusion die of the present invention, which die is different from the one illustrated in FIG. 4. FIG. 7 is a cross-sectional view of an example of the extrusion die of the present invention, which die is different from the one illustrated in FIG. 6. FIG. 8 is a cross-sectional view of an example of the inner structure of the extrusion die of the present invention taken along the line X-X in FIG. 7. The extrusion die illustrated in FIGS. 6 to 8 is provided with a junction 12 having the flow path C in place of the junction 8 of the extrusion die illustrated in FIGS. 3 and 5. By providing the flow path C, it becomes possible to control the laminated flow supplied from the nozzles and hole 14s to the junction by the flow of the resin supplied from the flow path C, so that the variety of designable laminated films can be increased. As a result, it becomes possible to obtain a laminated film having superior characteristics. The resin supplied to the flow path C may be either the resin A or the resin B, or in some cases, may be a resin different from the resins A and B. When the resin A or B is used, the flow path may be branched from the flow path to the hole 14 or the nozzle; however, since the resins are preferably supplied to the nozzle and hole 14 from an extrusion machine, an inlet port communicating with the flow path C is provided on the side wall of the second slit section as illustrated in FIG. 8. In this case, since the flow rate from the flow path C can be controlled independently from the flow rate from the nozzle and hole 14, the structural control becomes easier. More specifically, the thickness of the resin to which the resin B is incorporated can be controlled by the flow rate from the flow path C, and the shape of the layer made of the resin B can be controlled by the flow rate from the flow path C.

The flow path C is preferably a slit flow path extending in the width direction. When the flow path is a slit flow path extending in the width direction, the resins can be supplied without any variation in the flow rate in the width direction and a laminated flow laminated at a high precision can be obtained. As a result, a laminated film of a large area having uniform characteristics can be obtained.

It is also preferable that the distance between the slit flow paths varies in the width direction. The distance between slit flow paths used herein means a length between the walls in the flow direction of the flow path. In this extrusion die, the laminated flow output from the nozzle and hole 14s is further laminated at the junction to obtain a laminated flow having a number of layers in the width direction. Depending on the flow characteristics of the resin and the flow ratio, there is a difference in the flow rate between the position where the center of the nozzle communicates with the junction and the position between the nozzles, resulting, in some cases, in a change in the lamination structure of the laminated flow at the junction. In view of this, by narrowing the distance between the slit flow paths at the center of the nozzle in the width direction and broadening the space between the flow paths corresponding to the area between the nozzles, it becomes possible to minimize the change in the flow rate at the junction, so that a laminated flow laminated at a high precision can be produced. As a result, a laminated film of a large area having uniform optical characteristics can be obtained.

Figure 9:
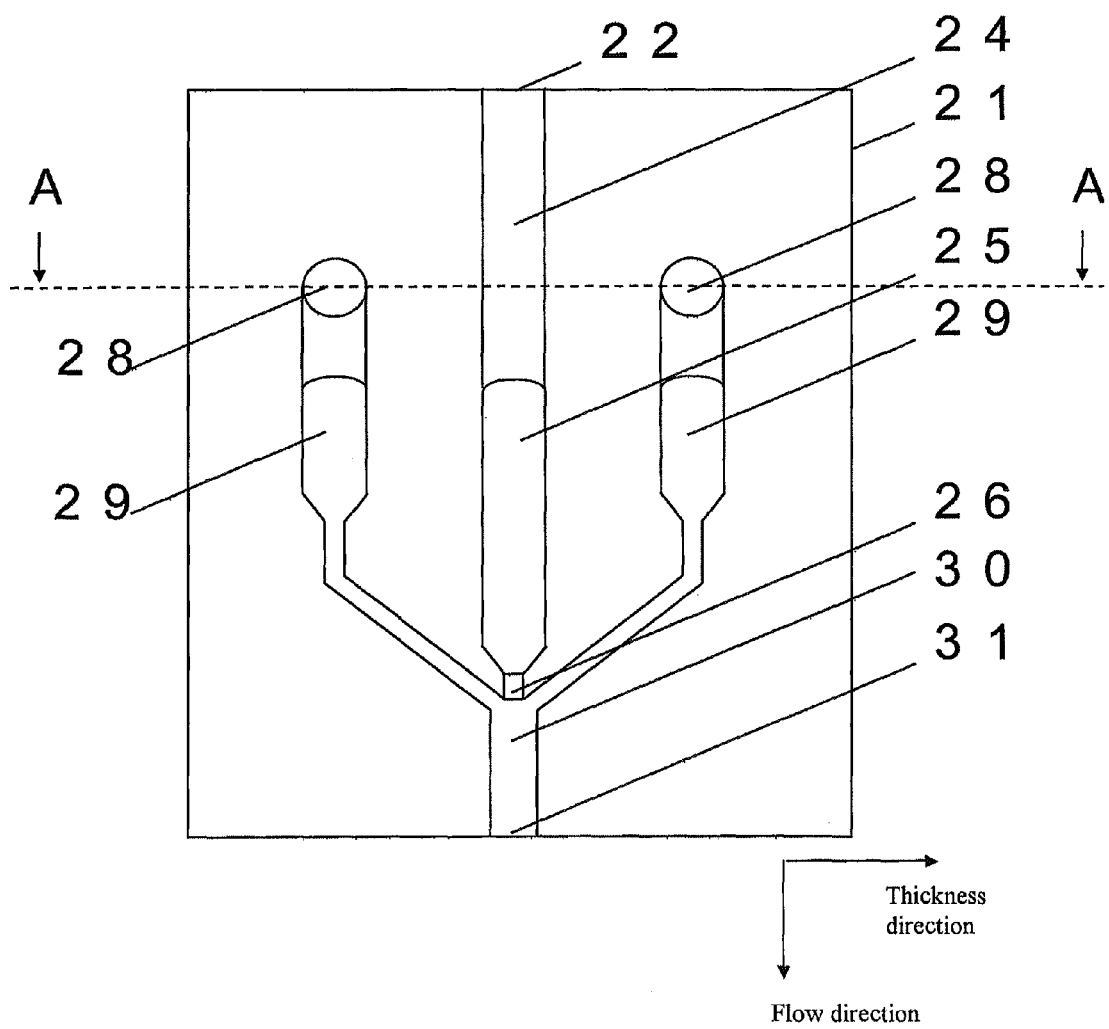
FIG. 9 is a cross-sectional view illustrating the internal structure of an example of an extrusion die according to another embodiment of the present invention.
Figure 10:
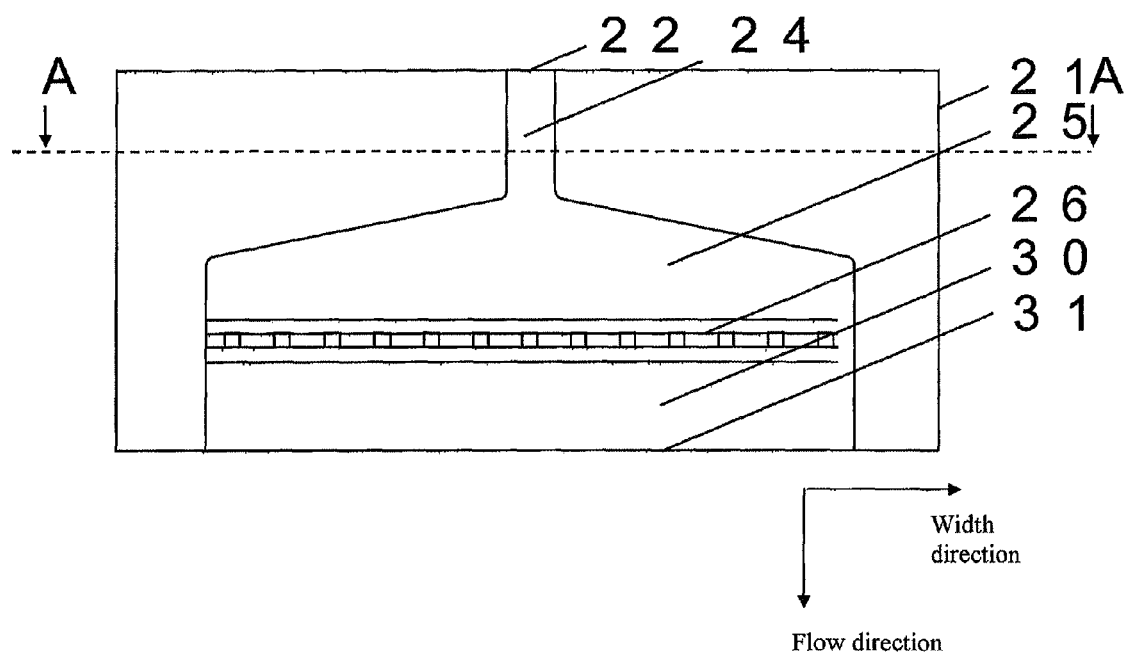
FIG. 10 is a cross-sectional view illustrating the internal structure of an example of an extrusion die according to another embodiment of the present invention.
Figure 11:
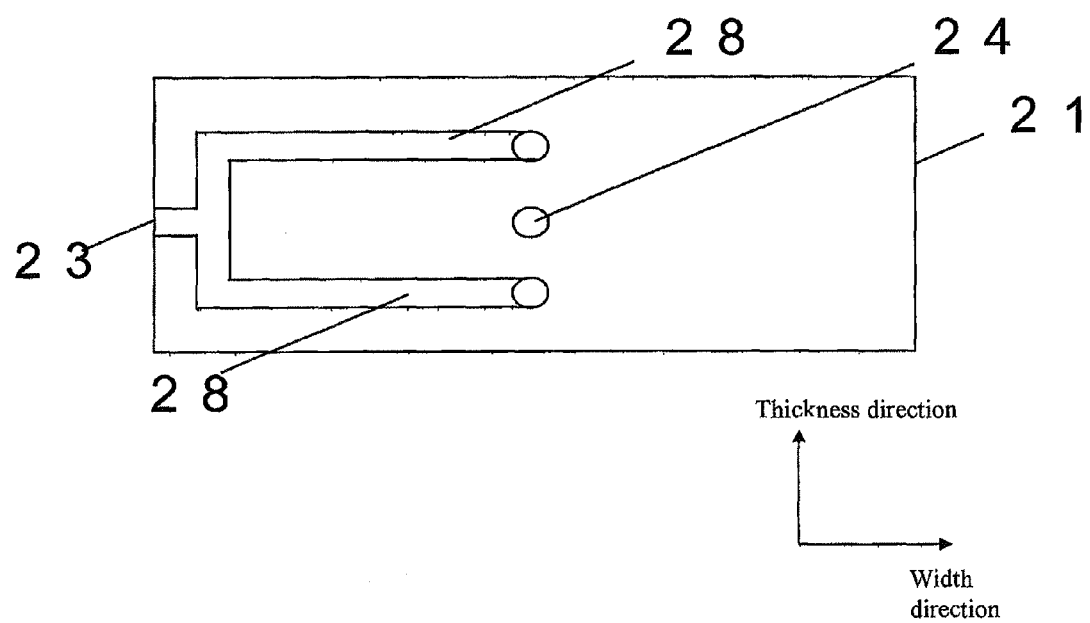
FIG. 11 is a cross-sectional view illustrating the internal structure of an example of the extrusion die, taken along the line A-A in FIGS. 9 and 10.

FIGS. 9 to 12 illustrate another example of an extrusion die capable of forming the film of the present invention. FIGS. 9 and 10 are a lateral cross-sectional view and a vertical cross-sectional view of the extrusion die, respectively. FIG. 11 is a cross-sectional view taken along the line A-A in FIGS. 9 and 10.

Figure 12:
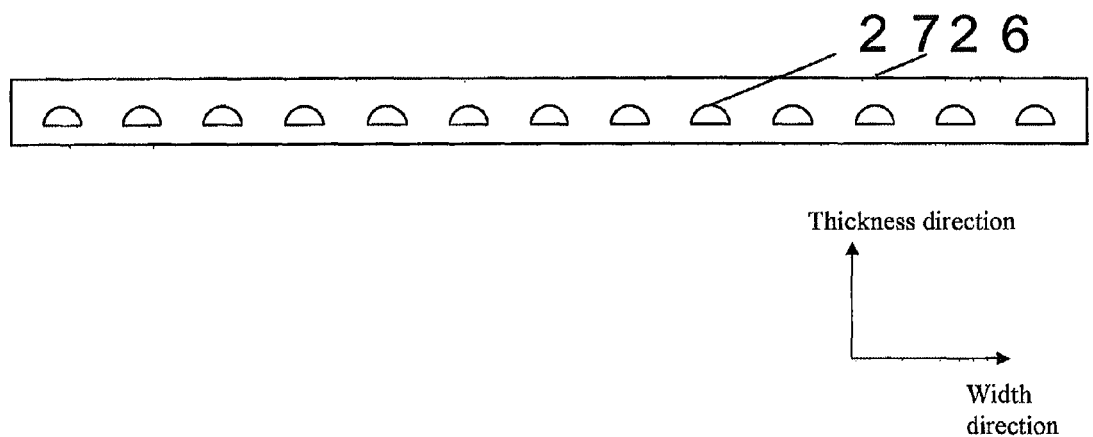
FIG. 12 is a plan view of a multi-hole plate 26 as viewed from the upstream side.

An extrusion die 21 is provided with a guide port 22 for supplying the resin B and a guide port 23 for supplying the resin A. The guide port 22 communicates with a manifold 25 via a flow path 24, and a multi-hole plate 26 having a number of hole 27s is provided at the downstream side of the manifold. FIG. 12 is a diagram of the multi-hole plate 26 as viewed from the upstream side. Meanwhile, the guide port 23 communicates with manifold 29s via flow path 28s. The multi-hole plate 26 and manifold 29s communicate at a junction 30, from where they are connected to a lip 31 for extruding the resin to the outside. At the junction 30, the resin B supplied to the junction 30 via the hole 27s of the multi-hole late 26 is extruded into the resin A supplied to the junction 30 via the manifold 29s. As a result, a composite flow in which, within the resin A, dispersions are formed in the shape corresponding to the shape of the holes can be obtained.

The shape of the holes of the multi-hole plate 26, the number of holes, the distance between the holes and the like are appropriately determined depending on the desired cross-sectional shape of the resulting resin film. The cross-sectional shape of the hole 27 may take various shapes such as a circle, an ellipsoid, a circular shape, and a polygon such as a triangle, a tetragon, a parallelogram, a pentagon or a hexagon. Particularly, in the extrusion die used for forming the laminated film of the present invention, the hole 27 is preferably asymmetrical relative to the center axis in the thickness direction. The center axis in the thickness direction used herein refers to a straight line parallel to the width direction and at an equal distance from the apexes of the upper and lower surfaces of each hole in the width direction. By using such a hole, it becomes possible to obtain a laminated film having the layer B asymmetrical relative to the center axis in the thickness direction. Further, a shape such as a rectangle having a very long side can also be formed by allowing the resin Bs to join at the junction by arranging circular or rectangular holes side by side. When using such extrusion die, the number of the layer Bs can be adjusted with the number of holes. The number of holes is 10 or larger, preferably 250 or larger, more preferably 500 or larger, and most preferably 1,000 or larger. Further, the cross-sectional width of the layer B can be adjusted with the shape of the nozzles and extruded amount therefrom.

The laminated flow thus formed in the extrusion die is extruded from the extrusion die, and subsequently cooled and solidified by a casting drum, a calendar ring roll or the like. Since the distance between the layer Bs may vary due to a neck-down phenomenon when the laminated flow is extruded from the extrusion die, it is preferable to provide an edge guide at the end of the extrusion die lip. The edge guide is provided between the extrusion die lip and cooling member in order to restrict the end of a resin film extruded from the extrusion die. The neck-down can be suppressed by a surface tension provided by a slight contact between the edge guide and the resin. In this manner, although the laminated film extruded from the extrusion die is thinned in the thickness direction in accordance with the relation between the extruded amount and the extrusion velocity, since the dimension in the width direction will not be changed, the precision of each layer in the width direction is improved.

For cooling and solidifying the laminated flow, it is preferable to use a method of tightly adhering the laminated flow to a cooling member such as a casting drum by an electrostatic force using an electrode of a wire-, tape-, needle-, knife-shape or the like, a method of tightly adhering the laminated flow to a cooling member such as a casting drum by blowing air from an apparatus of a slit-, spot-, plane-shape or the like, or a method of tightly adhering the laminated flow by using a roll.

The thus obtained laminated film is subjected to stretching or the like if necessary, and wound by a winder. The laminated film of the present invention is preferably a film not stretched or a uniaxially stretched film. More preferably, the laminated film of the present invention is a film not stretched and almost completely maintains the shape of the laminated flow laminated at a high precision by the extrusion die; so that a width-direction multi-layered laminated film of a large area having uniform characteristics can be obtained.

The laminated film of the present invention is preferably wound without oscillation. If oscillation is performed, it is not preferable because a film roll of the layer B may move in a zigzag way. However, there is a problem that, if oscillation is not performed, the wound appearance of the film roll is degraded due to the uneven thickness of the film, resulting in the formation of a film having poor flatness. In view of this, when winding the laminated film of the present invention, it is preferable to perform a knurling process. It is also preferable to laminate a protective film.

Description will be made below on the differences between the extrusion die according to embodiments of the present invention and a known extrusion die.

In the method of laminating a film in the width direction by using a mixer, which method is disclosed in Patent Documents 1 and 2, several layers of laminated flow are divided and re-laminated to increase the number of layers. However, since the lamination structure changes due to a change in the flow velocity and the flow direction during the process of the division and re-lamination, variation in the distance between the layers, the cross-sectional area and the shape of each layer becomes severe.

In the method disclosed in Patent Document 3 using an integrated apparatus having a number of slits, it is possible to laminate a desired number of layers in a uniform shape by using the slits and achieve an considerable improvement in the lamination precision, compared to a method of laminating layers in the width direction by using a mixer. However, this method also has a limit.

As for the slit, it is advantageous that the space between slits and the width of the partition wall between slits be wide so some degree because of the problems in the strength and the processing precision of each slit. It is therefore advantageous to compress a flow after lamination to a desired width. Because of this, a slight variation occurs in the layer shape at various positions in the width direction during the compression process of the flow path in the width direction. Consequently, the lamination precision is insufficient particularly for use having a major influence on the characteristics associated with the shape of the laminated layer, such as optical diffusion and collection. Further, in addition to the influence of the compression in the width direction, due to the long flow length between the slit where the laminated flow is produced and the extrusion die from which the laminated flow is extruded, there are cases where the shape laminated via the slits is deformed during the resin flow. In order to increase the number of the layers, since the apparatus has to be enlarged, the assembly and handling performance becomes inferior, so that such an apparatus is not suitable for laminating a very large number of layers. In the extrusion die of the present invention, by making the nozzles and holes small in size, the nozzles and holes can be arranged more densely than the slits. Since the flow path is not required to be compressed in the width direction after lamination and it is possible even to shorten the flow length in order to carry out lamination within the extrusion die, a high lamination precision can be attained. Further, by densely arranging the nozzles and holes and by having an integrated extrusion die, the apparatus can be made compact; therefore, such apparatus having excellent handling performance is advantageous in laminating a number of layers.

In an integrated apparatus having a number of slits, processings requiring time and skills such as wire discharge processing are performed because slit processing is required with a high precision, resulting in a high manufacturing cost. Since increasing the number of layers has considerable influence on the manufacturing cost, it is difficult to simultaneously attain broadening of the film width and an increase in the number of layers. In contrast, in the extrusion die according to an embodiment of the present invention, since the nozzles necessary for manufacturing the extrusion die can be easily prepared by cutting pipes having the same diameter, the extrusion die capable of laminating layers at a high precision can be manufactured at a low cost; therefore, this is advantageous in increasing the number of layers and broadening the film. In addition, since the diameters of the nozzles can be made approximately uniform by cutting pipes having the same diameter, the flow rate of the layer B in the width direction can be uniformized, so that a high lamination precision can be easily attained. In this manner, as compared to the conventional techniques, it is possible to obtain a laminated film having a broader width by using the extrusion die of the present invention.

In an integrated apparatus having a number of slits, only a rectangular cross-sectional shape can be produced because of its lamination method. On the other hand, in the extrusion die according to an embodiment of the present invention, it is possible to form a variety of layer B cross-sectional shapes because of the shapes of the nozzles, holes and holes, so that a laminated film having superior characteristics can be obtained. Also in an integrated apparatus having a number of slits, since all layers flow within the apparatus in contact with the walls of the apparatus, there is a problem that the shape of each layer is likely to be changed due to the difference among the viscosities and among the flow rates of the laminated resins. On the other hand, the resin Bs supplied from the nozzles are always covered with the resin A supplied from the holes 14 or the resin supplied from the flow path C; therefore, the resin Bs flow keeping a distance from the wall surfaces. Consequently, a change in the shape of the layer during the flow can be suppressed, so that it is possible to obtain a laminated film having a higher lamination precision.

EXAMPLES

Evaluation methods of the physical properties used in the present invention will now be described.

(1) Cross-Sectional Width, Average Cross-Sectional Width, Number of Layers, and Shape of Layer B First, a film width direction-thickness direction cross-section to be observed was smoothened with a polishing machine. The cross-section of the film was cut out using a utility knife. The film was sandwiched on both the surface by acrylic plates 2 mm thick and fixed to a jig. Next, the cross-section of the film was smoothened using a polishing machine (NAP-240 from NISSHIN KASEI CO., LTD.) by adhering a #6000 grit polishing film (abrasive, aluminum oxide) to a polishing plate and polishing the film at 240 rpm of the polishing plate for 10 minutes using pure water as a polishing solution. This process was carried out sequentially for every width of the films. The layer B was then measured for cross-sectional width, number of layers, and shape using a noncontact three coordinate measuring machine (NEXIV VMR-H3030TZ from Nikon Corporation).

Samples were placed at the center of the stage of the non-contact three coordinate measuring machine such that the smoothened cross-section could be seen, and were photographed at 3 magnification in cases where the cross-sectional width of the layer B was about 800 μm, at 10 magnification in cases where the cross-sectional width of the layer B was about 100 μm, and at 100 magnification in cases where the cross-sectional width of the layer B was about 10 μm. The shape of the layer B was determined from the images obtained. When the photographing was not completed within one stroke range, the measurement was continued after shifting and resetting the samples. The captured images were analyzed with an image processing software, Image-Pro Plus ver. 4 (sold by Planetron Co., Ltd.), and image processing was carried out as required. The image processing was carried out for clarifying the shape of the layers; for example, binarization by the software attached to the product, low-pass filter processing and the like were carried out. An image analysis program was used for the analysis and the layer B was measured, for every width of the films, for cross-sectional width, center of gravity, cross-sectional area, and coordinate information.

With respect to the cross-sectional width obtained, the average cross-sectional width was defined as the mean value of all the cross-sectional width; as an accuracy of the cross-sectional width, the film in which the number of layer Bs which satisfied the average cross-sectional width ±10 μm was more than half was defined as B, the film in which the layer B which satisfied the average cross-sectional width ±10 μm existed continuously in the width direction for 300 mm or more was defined as A, the film in which the number of layer Bs which satisfied the average cross-sectional width ±10 μm was less than half was defined as C, and the film in which the cross-sectional width of the layer B varied periodically was further defined as D. For all adjacent layer Bs, the distance between them was calculated from the center of gravity obtained, the film in which the layer B, wherein the distance between adjacent layer Bs, P, was 0.90 times to 1.10 times as large as the distance between adjacent layer Bs at the center of the film in the width direction, Pc, existed continuously in the width direction for 300 mm or more, and for less than 300 mm, were defined as A and C, respectively. The film in which the distance between adjacent layer Bs varied periodically was further defined as D. With respect to the cross-sectional area, the film in which the layer B, wherein the cross-sectional area of the layer B, A, was 0.90 times to 1.10 times as large as the cross-sectional area of the layer B located at the center of the film in the width direction, Ac, existed for 300 mm or more, and for less than 300 mm, were defined as A and C, respectively. For each layer B, a centerline, which passed through the midpoint of the coordinates at both ends in the thickness direction and was parallel with the surface of the film, was constructed and the cross-sectional area divided by the centerline was detected. S1/S2 was calculated from S1 and S2 for each layer, and a layer whose mean value of S1/S2 was not more than 0.8 was defined as A and a layer whose mean value of S1/S2 was more than 0.8 was defined as C (see Table).

(2) Transmittance Ununiformity

All light transmittances were measured on the basis of JIS K7736-1 (1996) using NIPPON DENSHOKU INDUSTRIES CO., LTD. Turbidimeter NDH5000. For every width of the films, the all light transmittances were measured at 10 points at regular intervals and the difference between the maximum and minimum values of the all light transmittances at the 10 points was defined as transmittance ununiformity.

(3) Average Loss, Loss Ununiformity

The measurements were made by the cut back method (IEC60793-CIA) in accordance with JIS C6823 (1999) at 25° C., 65% RH. Samples with testing length of 10 cm, 9 cm, 8 cm and 7 cm were provided and each sample was measured for insertion loss. As the light source, an LED (0901A manufactured by Anritsu Corporation) with a wavelength of 850 nm was used, and light was input into the sample through a mode scrambler. As the optical fibers, a multimode fiber type GI (NA0.21) having a diameter of 50 μm was used for the input side, and an SI type fiber (NA0.22) having a core diameter of 0.2 mm was used for the detection side. In the input/output of the light, optical axes were aligned with a waveguide alignment device. As the detector, an optical power sensor (MA9421A, Anritsu Corporation) was used. Propagation loss was determined using the least-squares method by plotting the insertion loss for the length. That is, the inclination of a linear expression obtained was defined as loss. In the least square, only the contribution ratio R2 of 0.99 or more was adopted as the propagation loss. If the contribution ratio was not more than 0.99, remeasurements such as realignment and readjustment of the samples were repeated until the value of 0.99 or more was obtained. For every width of the films, each loss at the 10 points at regular intervals was measured, and the mean value was defined as average loss. The difference between the maximum and minimum values of the losses at the 10 points was defined as loss ununiformity.

(4) Winding Hardness Variation

The surface layer of the film roll of a winding length of 500 m was measured for winding hardness at 10 points in the width direction using KOBUNSHI KEIKI CO., LTD. ASKER A type rubber hardness tester in accordance with HS K7215 (1986). The difference between the maximum and minimum values was defined as winding hardness variation.

Example 1

The following resin A and resin B were provided.
Resin A: Polypropylene (PP)
Polypropylene Noblen WF836DG manufactured by Sumitomo Chemical
Resin B: Polycarbonate (PC)
Polycarbonate LC1700 manufactured by Idemitsu Kosan Then resin A was fed to an extruder 1 and resin B was fed to an extruder 2. The resins were melted in the respective extruders at 280° C., and were flown into an extrusion die 700 mm wide as shown in FIGS. 3 to 5 after passing through a gear pump and a filter. The extrusion die was provided with 600 rectangular nozzles, through which the resin B flew. The sheet from the extrusion die was nip-cast on a drum maintained at a temperature of 80° C. while being engaged at the end portions thereof with edge guides. The resultant was then cut off by 45 mm at both end portions and wound with a winder without causing an oscillation. Next, the resultant was wound with a slitter while being subjected to a knurling-process and laminated with a protective film (PANAC Corporation, heat-resistant protective film HP25) on one side to provide a film roll. The laminated film obtained had a thickness of 1000 µm (excluding the protective film). Resin B was arranged successively in the longitudinal direction and at substantially regular intervals of 1 mm±0.05 mm in the width direction, forming the structure in which the resin B was covered with resin A. The cross-sectional shape of the resin B was substantially circular and there were 600 pieces of the resin B with a cross-sectional width of 800 µm±8 µm. Table 1 shows the structure and performance of the laminated film obtained. The film obtained was able to transmit light with a small loss and therefore suitable for an optical waveguide, light guide and illumination apparatus. On the other hand, although the film had a capability of emitting the light that had impinged, though it was low, on the film perpendicularly to the surface in the oblique direction to the film surface, this film could be used as a light-collecting film or an anisotropic diffusion film.

Example 2

A film was prepared under substantially the same conditions as in Example 1 except that the extrusion die used was 1900 mm wide and provided with 1800 nozzles and that the discharge rate was adjusted. The film obtained had a thickness of 1000 µm (excluding the protective film). Resin B was arranged successively in the longitudinal direction and at substantially regular intervals of 1 mm±0.09 mm in the width direction, forming the structure in which the resin B was covered with resin A. The cross-sectional shape of the resin B was substantially circular and there were 1800 pieces of the resin B with a cross-sectional width of 800 µm±9 µm. Table 1 shows the structure and performance of the laminated film obtained. The film obtained was able to transmit light with a small loss and therefore suitable for an optical waveguide, a light guide and an illumination apparatus.

Example 3

The following resin A and resin B were provided.
Resin A: Polycarbonate (PC)
Polycarbonate LC1700 manufactured by Idemitsu Kosan
Resin B: Polycarbonate (PC)+carbon black (CB) 2 wt %

Then resin A was fed to an extruder 1 and resin B was fed to an extruder 2. The resins were melted in the respective extruders at 290° C., and were flown into an extrusion die 700 mm wide as shown in FIGS. 3 to 5 after passing through a gear pump and a filter. The extrusion die was provided with 3000 rectangular nozzles that were longer in the thickness direction than in Example 1, through which the resin B flew. The sheet from the extrusion die was nip-cast on a drum maintained at a temperature of 80° C. while being engaged at the end portions thereof with edge guides. The resultant was then cut off by 45 mm at both end portions and wound with a winder without causing an oscillation. Next, the resultant was wound with a slitter while being subjected to a knurling-process and laminated with a protective film (PANAC Corporation, heat-resistant protective film HP25) on one side to provide a film roll. The film obtained had a thickness of 500 µm (excluding the protective film). Resin B was arranged successively in the longitudinal direction and at substantially regular intervals of 200 µm±10 µm in the width direction, forming the structure in which the resin B was covered with resin A. The cross-sectional shape of the resin B was substantially rectangular and there were 3000 pieces of resin B with a height (length in the thickness direction) of about 450 µm and a cross-sectional width of 100 µm±2 µm. Table 1 shows the structure and performance of the laminated film obtained. The film obtained substantially transmitted the light in the direction perpendicular to the film surface but hardly transmitted the light that was oblique by 15° or more in the width direction to the film surface. This film was suitable as a view angle control film.

Example 4

The following resin A and resin B were provided.
Resin A: Polyethylene naphthalate (PEN)
P100 manufactured by invista
Resin B: Polyester copolymer (PCT/I)
Z6006 manufactured by Eastman Then resin A was fed to an extruder 1 and resin B was fed to an extruder 2. The resins were melted in the respective extruders at 290° C., and were flown into an extrusion die 700 mm wide as shown in FIGS. 3 to 5 after passing through a gear pump and a filter. The extrusion die was provided with 3000 rectangular nozzles that were oblique by 45° to the second slit surface, through which the resin B flew. The sheet from the extrusion die was closely contacted with a drum maintained at a temperature of 40° C. by applying high voltages to a wire electrode while being engaged at the end portions thereof with edge guides. The resultant was then cut off by 45 mm at both end portions and wound with a winder without causing an oscillation. Next, the resultant was wound with a slitter while being subjected to a knurling-process and laminated with a protective film (PANAC Corporation, heat-resistant protective film HP25) on one side to provide a film roll. The film obtained had a thickness of 500 µm (excluding the protective film). Resin B was arranged successively in the longitudinal direction and at substantially regular intervals of 200 µm±15 µm in the width direction, forming the structure in which the resin B was covered with resin A. The cross-sectional shape of the resin B was substantially parallelogram and there were 3000 pieces of resin B with a height (length in the thickness direction) of about 450 µm and a cross-sectional width of 100 µm±2 µm. Table 1 shows the structure and performance of the laminated film obtained. The film obtained had a capability of emitting the light that had impinged on the film perpendicularly to the surface in the oblique direction to the film surface. This film was suitable as a light-collecting film or an anisotropic diffusion film.

Example 5

The following resin A and resin B were provided.
Resin A: Polycarbonate (PC)
Polycarbonate LC1700 manufactured by Idemitsu Kosan
Resin B: Polycarbonate (PC)+Polymethylpentene (PMP) 25 wt %
DX820 manufactured by Mitsui Chemicals Then resin A was fed to an extruder 1 and resin B was fed to an extruder 2. The resins were melted in the respective extruders at 280° C., and were flown into an extrusion die 700 mm wide as shown in FIGS. 3 to 5 after passing through a gear pump and a filter. The extrusion die was provided with 3000 rectangular nozzles that were longer in the thickness direction than in Example 1, through which the resin B flew. The sheet from the extrusion die was nip-cast on a drum maintained at a temperature of 80° C. while being engaged at the end portions thereof with edge guides. The resultant was then cut off by 45 mm at both end portions and wound with a winder without causing an oscillation. Next, the resultant was wound with a slitter while being subjected to a knurling-process and laminated with a protective film (PANAC Corporation, heat-resistant protective film HP25) on one side to provide a film roll. The film obtained had a thickness of 500 μm (excluding the protective film). Resin B was arranged successively in the longitudinal direction and at substantially regular intervals of 200 μm±10 μm in the width direction, forming the structure in which the resin B was covered with resin A. The cross-sectional shape of the resin B was substantially rectangular and there were 3000 pieces of resin B with a height (length in the thickness direction) of about 450 μm and a cross-sectional width of 100 μm±2 μm. Table 1 shows the structure and performance of the laminated film obtained. The film obtained strongly diffused the light, only in longitudinal direction, that had impinged on the film in the direction perpendicular to the surface. This film was suitable as an anisotropic diffusion film.

Example 6

The following resin A and resin B were provided.
Resin A: Polymethylmethacrylate (PMMA)
MGSS manufactured by Sumitomo Chemical
Resin B: Polystyrene (PS)
G120K manufactured by Japan PolyStyrene Inc.

Then resin A was fed to an extruder 1 and resin B was fed to an extruder 2. The resins were melted in the respective extruders at 230° C., and were flown into an extrusion die 700 mm wide as shown in FIGS. 3 to 5 after passing through a gear pump and a filter. The extrusion die was provided with 600 rectangular nozzles, through which the resin B flew. The sheet from the extrusion die was nip-cast on a drum maintained at a temperature of 80° C. while being engaged at the end portions thereof with edge guides. The resultant was then cut off by 45 mm at both end portions and wound with a winder without causing an oscillation. Next, the resultant was wound with a slitter while being subjected to a knurling-process and laminated with a protective film (PANAC Corporation, heat-resistant protective film HP25) on one side to provide a film roll. The laminated film obtained had a thickness of 1000 μm (excluding the protective film). Resin B was arranged successively in the longitudinal direction and at substantially regular intervals of 1 mm±0.10 in the width direction, forming the structure in which the resin B was covered with resin A. The cross-sectional shape of the resin B was substantially circular and there were 600 pieces of resin B with a cross-sectional width of 800 μm±8 μm. Table 1 shows the structure and performance of the laminated film obtained. The film obtained was able to transmit light with a small loss and therefore suitable for an optical waveguide, a light guide and an illumination apparatus.

The end face of the film obtained in the width direction was immersed in acetic acid at 50° C. for one day and the covering PMMA was dissolved to obtain a laminated film, the end portions of which were made up of a number of polystyrene yarn. Bundling the polystyrene yarn of this laminated film allowed for easy individual connection to the point source of LED.

Example 7

A laminated film was obtained in substantially the same manner as in Example 1 except that the film roll was obtained with a slitter without being subjected to a knurling-process and laminated with a protective film. The laminated film obtained had a thickness of 1000 μm (excluding the protective film). Resin B was arranged successively in the longitudinal direction and at intervals of 1 mm±0.2 mm in the width direction; the layer Bs whose distance to the adjacent layer Bs was 0.90 times to 1.10 times as large as the distance between the adjacent layer Bs at the center in the width direction existed continuously for 0.05 mm at most. The structure was formed in which the resin B was covered with resin A. The cross-sectional shape of the resin B was substantially circular and there were 600 pieces of resin B with a cross-sectional width of 800 μm±8 μm. Table 1 shows the structure and performance of the laminated film obtained. The film obtained, though it had slightly poor flatness, was able to transmit light with a small loss and therefore suitable for an optical waveguide, a light guide and an illumination apparatus.

Example 8

A film was prepared under substantially the same conditions as in Example 1 except that the die shape, such as die width and number of nozzles, and the discharge rate were changed. The laminated film obtained had a thickness of 1650 μm (excluding the protective film) and a width of 600 mm. Resin B was arranged successively in the longitudinal direction and at substantially regular intervals of 1.8 mm±0.1 mm in the width direction, forming the structure in which the resin B was covered with resin A. The cross-sectional shape of the resin B was substantially circular and there were 500 pieces of resin B with a cross-sectional width of 1600 μm±9 μm. Table 1 shows the structure and performance of the laminated film obtained. The film obtained was able to transmit light with a small loss and therefore suitable for an optical waveguide, a light guide and an illumination apparatus.

Example 9

A film was prepared under substantially the same conditions as in Example 3 except that the ratio of the discharge rate of the resin was changed.

The film obtained had a thickness of 500 μm (excluding the protective film) and a width of 600 mm. Resin B was arranged successively in the longitudinal direction and at substantially regular intervals of 200 μm±20 μm in the width direction, forming the structure in which the resin B was covered with resin A. The cross-sectional shape of the resin B was substantially rectangular and there were 3000 pieces of resin B with a height (length in the thickness direction) of about 450 μm and a cross-sectional width of 9 μm±0.1 μm. Table 1 shows the structure and performance of the laminated film obtained. The film obtained substantially transmitted the light in the direction perpendicular to the film surface but hardly transmitted the light that was oblique by 45° or more in the width direction to the film surface. This film was suitable as a view angle control film.

Example 10

A film was prepared under substantially the same conditions as in Example 1 except that the extrusion die having the passage C as shown in FIGS. 6 to 8 was used, where resin A was supplied to the passage C and the supply flow rate was adjusted such that the total flow rate of the resin A supplied from the hole 14 and the resin A from the passage C was the same as in Example 1. The laminated film obtained had a thickness of 1000 μm (excluding the protective film). Resin B was arranged successively in the longitudinal direction and at regular intervals of 1 mm±0.03 mm in the width direction, forming the structure in which the resin B was covered with resin A. The cross-sectional shape of the resin B was substantially circular and there were 600 pieces of resin B with a cross-sectional width of 800 μm±3 μm. Table 1 shows the structure and performance of the laminated film obtained. The film obtained, having a shape close to true circle compared to the film shown in Example 1, was able to transmit light with a small loss, and more suitable for an optical waveguide, a light guide and an illumination apparatus particularly than the film shown in Example 1 because the connection when used was easy.

Example 11

A film was prepared under the same conditions as in Example 8 except that the rectangular nozzles that were longer in the thickness direction than in Example 1 were used. The laminated film obtained had a thickness of 500 μm (excluding the protective film) and a width of 600 mm. Resin B was arranged successively in the longitudinal direction and at substantially regular intervals of 1.8 mm±0.1 mm in the width direction, forming the structure in which the resin B was covered with resin A. The cross-sectional shape of the resin B was substantially rectangular and there were 500 pieces of resin B with a height (length in the thickness direction) of about 450 μm and a cross-sectional width of 1600 μm±9 μm. Table 1 shows the structure and performance of the laminated film obtained. The film obtained was further subjected to surface roughening by applying an embossing process thereto using an embossing roll having a 100 μm pitch and 100 μm deep groove in the width direction. The film obtained had a part not covered by resin A and emitted light from the roughened surface prepared by the embossing process when the light impinged on the end faces of the film; it was suitable as plane illumination.

Example 12

A film was prepared and an embossing process was carried out under the same conditions as in Example 14 except that the extrusion die having a width of 1000 mm was used. The laminated film obtained had a thickness of 500 μm (excluding the protective film) and a width of 900 mm. Resin B was arranged successively in the longitudinal direction and at substantially regular intervals of 2.8 mm±0.1 mm in the width direction, forming the structure in which the resin B was covered with resin A. The cross-sectional shape of the resin B was substantially rectangular and there were 500 pieces of resin B with a height (length in the thickness direction) of about 450 μm and a cross-sectional width of 2700 μm±14 μm, about 70% of the layer Bs satisfying the average cross-sectional width ±10 μm. Table 1 shows the structure and performance of the laminated film obtained. The film obtained had a part not covered by resin A and emitted light from the roughened surface prepared by the embossing process when the light impinged on the end faces of the film; it was suitable as plane illumination but had slightly low brightness compared to Example 14.

Example 13

A film was prepared under the same conditions as in Example 5 except that the extrusion die was used, comprising nozzles which were provided such that the distance between the cross-sectional width of the layer B and the adjacent layer B periodically varied at 25 mm intervals. The film obtained had a thickness of 500 μm (excluding the protective film). Resin B was arranged successively in the longitudinal direction and the distance varied in the range of 150 to 250 μm at 25 mm intervals in the width direction, forming the structure in which the resin B was covered with resin A. The cross-sectional shape of the resin B was substantially rectangular and there were 3000 pieces of resin B with a height (length in the thickness direction) of about 450 μm and a cross-sectional width varying in the range of 75 to 125 μm at 25 mm intervals. Table 1 shows the structure and performance of the laminated film obtained. The film obtained strongly diffused the light, only in longitudinal direction, that had impinged on the film in the direction perpendicular to the surface; the film effectively prevented the brightness uniformity of the lamps especially when mounted on a display on which lamps were arranged at 25 mm intervals.

Example 14

A film was prepared under the same conditions as in Example 9 except that the resins below were used and the ratio of the discharge rate of the resin was changed.
Resin A: Polycarbonate (PC)
Polycarbonate LC1700 manufactured by Idemitsu Kosan
Resin B: Polycarbonate (PC)+Polymethylpentene (PMP) 25 wt %
DX820 manufactured by Mitsui Chemicals
The film obtained had a thickness of 500 μm (excluding the protective film) and a width of 600 mm. Resin B was arranged successively in the longitudinal direction and at substantially regular intervals of 200 μm±18 μm in the width direction, forming the structure in which the resin B was covered with resin A. The cross-sectional shape of the resin B was substantially rectangular and there were 3000 pieces of resin B with a height (length in the thickness direction) of about 450 μm and a cross-sectional width of 20 μm±1 μm. Table 1 shows the structure and performance of the laminated film obtained. The film obtained strongly diffused the light, only in the longitudinal direction, that had impinged on the film in the direction perpendicular to the surface, but slight optical ununiformity was observed. This film was suitable as an anisotropic diffusion film.

Example 15

A film was prepared under the same conditions as in Example 1 except that the ratio of the discharge rate of the resin and the speed of the casting drum were changed. The laminated film obtained had a thickness of 200 μm (excluding the protective film). Resin B was arranged successively in the longitudinal direction and at substantially regular intervals of 1 mm±0.05 mm in the width direction, forming the structure in which the resin B was covered with resin A. The cross-sectional shape of the resin B was substantially circular and there were 600 pieces of resin B with a cross-sectional width of 100 μm±12 μm. However, the variability in cross-sectional area was pronounced in some parts. Table 1 shows the structure and performance of the laminated film obtained. The film obtained was able to transmit light with a small loss and therefore suitable especially for communication uses.

Example 16

The following resin A and resin B were provided.

Resin A: Polyethylene terephthalate (PET)
+Polymethylpentene (PMP) 1 wt %

Resin B: Polyethylene terephthalate (PET)
+Polymethylpentene (PMP) 40 wt %

The above-described resins were polymerized by the method described below. First, to the mixture of 100 parts by weight of dimethyl terephthalate and 60 parts by weight of ethylene glycol, calcium acetate was added as an ester exchange reaction catalyst. The ester exchange reaction was performed by heating the resulting mixture to distill off methanol. Next, antimony trioxide as a polymerization catalyst and phosphoric acid as a heat stabilizer were added to the ester exchange reaction products, and the mixture was transferred to a polycondensation reaction vessel. Then, pressure in the reaction system was gradually reduced with heating. The reactant was stirred inside at a temperature of 290° C. under reduced pressure and polymerized while distilling off methanol to obtain PET resin.

Then resin A was fed to an extruder 1 and resin B was fed to an extruder 2. The resins were melted in the respective extruders at 280° C., and were flown into an extrusion die 500 mm wide as shown in FIGS. 9 to 12 after passing through a gear pump and a filter. The extrusion die was provided with 13 semicircular pores, through which the resin B flew. The sheet from the extrusion die was quickly solidified on a drum maintained at a temperature of 25° C. by application of an electrostatic voltage while being engaged at the end portions thereof with edge guides. The resultant was then cut off by 45 mm at both end portions and wound with a winder without causing an oscillation. The laminated film obtained had a thickness of 1500 μm. Resin B was arranged successively in the longitudinal direction and at substantially regular intervals of 25000 μm±1000 μm in the width direction, forming the structure in which the resin B was covered with resin A. The cross-sectional shape of the resin B was substantially semicircular and there were 13 pieces of resin B with a cross-sectional width of 10000 μm±500 μm and a thickness of 500 μm±20 μm. The particle size of PMP dispersed in the resin A and the resin B was 10 μm. Table 1 shows the structure and performance of the laminated film obtained. The film obtained was able to diffuse the light strongly at the layers made up of resin B (layer Bs) and to prevent the brightness uniformity of the lamps by arranging the layer Bs above the 25 mm-interval lamps of a back light.

Example 17

A film was prepared under the same conditions as in Example 16 except that the resins below were used.

Resin A: Polyethylene terephthalate (PET)
+Polymethylpentene (PMP) 1 wt %

Resin B: Polyethylene terephthalate (PET)
+titanium oxide particle (Ti) 4 wt %

The laminated film obtained had a thickness of 1500 μm. Resin B was arranged successively in the longitudinal direction and at substantially regular intervals of 25000 μm±1000 μm in the width direction, forming the structure in which the resin B was covered with resin A. The cross-sectional shape of the resin B was substantially semicircular and there were 13 pieces of resin B with a cross-sectional width of 10000 μm±500 μm and a thickness of 500 μm±20 μm. The particle size of PMP dispersed in the resin A was 10 μm and the particle size of Ti particles dispersed in the resin B was 0.25 μm. Table 1 shows the structure and performance of the laminated film obtained. The film obtained was able to diffuse the light strongly at the layers made up of resin B (layer Bs) and to prevent the brightness uniformity of the lamps more effectively by arranging the layer Bs above the 25 mm-interval lamps of a back light.

Example 18

The following resin A and resin B were provided.

Resin A: Polyethylene terephthalate (PET)
+Polymethylpentene (PMP) 1 wt %

Resin B: Polyester copolymer (PCT/I)
+Polymethylpentene (PMP) 40 wt %

The extrusion die comprising 1200 semicircular pores was used. A film was prepared under the same conditions as in Example 16 except that these resins and extrusion die were used. The film obtained had a thickness of 250 μm. Resin B was arranged successively in the longitudinal direction and at substantially regular intervals of 300 μm±10 μm in the width direction, forming the structure in which the resin B was covered with resin A. The cross-sectional shape of the resin B was pseudo-semicircular and there were 1200 pieces of resin B with a cross-sectional width of 200 μm±7 μm and a thickness of 120 μm±2 μm. The particle size of PMP dispersed in the resin A and the resin B was 10 μm. Table 1 shows the structure and performance of the laminated film obtained. The film obtained had a strong anisotropic diffusibility and was able to prevent the brightness uniformity of the back light lamps.

Comparative Example 1

The following resin A and resin B were provided.

Resin A: Polypropylene (PP)

Polypropylene Noblen WF836DG manufactured by Sumitomo Chemical

Resin B: Polycarbonate (PC)

Polycarbonate LC1700 manufactured by Idemitsu Kosan

Then resin A was fed to an extruder 1 and resin B was fed to an extruder 2. The resins were melted in the respective extruders at 280° C. and passed through a gear pump and a filter. Then the resin A and the resin B were laminated alternately in the width direction into 1200 layers in total with known square mixer and extruded in the form of a sheet from the extrusion die 700 mm wide. The sheet from the extrusion die was nip-cast on a drum maintained at a temperature of 80° C. while being engaged at the end portions thereof with edge guides. The resultant was then cut off by 45 mm at both end portions and wound with a winder without causing an oscillation. Next, the resultant was wound with a slitter while being subjected to a knurling-process and laminated with a protective film (PANAC Corporation, heat-resistant protective film HP25) on one side to provide a film roll. The laminated film obtained had a thickness of 1000 μm (excluding the protective film). However, although the resin B was arranged successively in the longitudinal direction, it was not arranged at regular intervals in the width direction. Further, the shape of the layers was disturbed such that almost all the layers combined to the adjacent layers. Hence, the number of layer Bs having a cross-sectional width of not less than 0.1 μm and not more than 10000 μm was below 300. Table 1 shows the structure and performance of the laminated film obtained. The film obtained could hardly transmit the light.

TABLE 1

|  |  | Example 1 | Example 2 | Example 3 | Example 4 |
|---|---|---|---|---|---|
| Resin A | Resin | PP | PP | PC | PEN |
|  | Additive | — | — | — | — |
|  | Refractive Index | 1.48 | 1.48 | 1.59 | 1.64 |
| Resin B | Resin | PC | PC | PC | PCT/I |
|  | Additive | — | — | CB | — |
|  | Refractive Index | 1.59 | 1.59 | 1.59 | 1.56 |
| Difference Between Refractive Indices |  | 0.11 | 0.11 | 0.00 | 0.08 |
| B Layer | Average Cross-Sectional Width (μm) | 800 | 800 | 100 | 100 |
|  | Accuracy of Cross-Sectional Width | A | A | A | A |
|  | Accuracy of Interval | A | A | A | A |
|  | Accuracy of Cross-Sectional Area | A | A | A | A |
|  | S1/S2 | C | C | C | C |
|  | Number of Layers | 600 | 1800 | 3000 | 3000 |
|  | Shape of Cross-Section | Circle | Circle | Rectangle | Parallelogram |
|  | Covered/Uncovered | Covered | Covered | Covered | Covered |
| Film Width | (mm) | 600 | 1800 | 600 | 600 |
| Film Thickness | (μm) | 1000 | 1000 | 500 | 500 |
| Transparency Ununiformity | (%) | — | — | 1 | 0.5 |
| Average Loss | (dB) | 0.1 | 0.1 | — | — |
| Loss Ununiformity | (dB) | 0.02 | 0.02 | — | — |
| Winding Hardness Variation |  | — | 3 | 6 | 2 | 2 |

|  |  | Example 5 | Example 6 | Example 7 | Example 8 |
|---|---|---|---|---|---|
| Resin A | Resin | PC | PMMA | PP | PP |
|  | Additive | — | — | — | — |
|  | Refractive Index | 1.59 | 1.49 | 1.48 | 1.48 |
| Resin B | Resin | PC | PS | PC | PC |
|  | Additive | PMP | — | — | — |
|  | Refractive Index | — | 1.59 | 1.59 | 1.59 |
| Difference Between Refractive Indices |  | — | 0.10 | 0.11 | 0.11 |
| B Layer | Average Cross-Sectional Width (μm) | 100 | 800 | 800 | 1600 |
|  | Accuracy of Cross-Sectional Width | A | A | A | A |
|  | Accuracy of Interval | A | A | C | A |
|  | Accuracy of Cross-Sectional Area | A | A | A | A |
|  | S1/S2 | C | C | C | C |
|  | Number of Layers | 3000 | 600 | 600 | 500 |
|  | Shape of Cross-Section | Rectangle | Circle | Circle | Circle |
|  | Covered/Uncovered | Covered | Covered | Covered | Covered |
| Film Width | (mm) | 600 | 600 | 600 | 600 |
| Film Thickness | (μm) | 500 | 1000 | 1000 | 1650 |
| Transparency Ununiformity | (%) | 2 | — | — | — |
| Average Loss | (dB) | — | 0.05 | 0.1 | 0.12 |
| Loss Ununiformity | (dB) | — | 0.01 | 0.02 | 0.03 |

TABLE 1-continued

|  |  | Example 9 | Example 10 | Example 11 | Example 12 |
|---|---|---|---|---|---|
| Winding Hardness Variation | — | 2 | 3 | 11 | 3 |

|  |  | Example 9 | Example 10 | Example 11 | Example 12 |
|---|---|---|---|---|---|
| Resin A | Resin | PC | PP | PP | PP |
|  | Additive | — | — | — | — |
|  | Refractive Index | 1.59 | 1.48 | 1.48 | 1.48 |
| Resin B | Resin | PC | PC | PC | PC |
|  | Additive | CB | — | — | — |
|  | Refractive Index | 1.59 | 1.59 | 1.59 | 1.59 |
| Difference Between Refractive Indices |  | 0.00 | 0.11 | 0.11 | 0.11 |
| B Layer | Average Cross-Sectional Width (μm) | 9 | 800 | 1600 | 2700 |
|  | Accuracy of Cross-Sectional Width | A | A | A | B |
|  | Accuracy of Interval | A | A | A | A |
|  | Accuracy of Cross-Sectional Area | A | A | A | A |
|  | S1/S2 | C | C | C | C |
|  | Number of Layers | 3000 | 600 | 500 | 500 |
|  | Shape of Cross-Section | Rectangle | Circle | Rectangle | Circle |
|  | Covered/Uncovered | Covered | Covered | Covered | Covered |
| Film Width | (mm) | 600 | 600 | 600 | 900 |
| Film Thickness | (μm) | 450 | 1000 | 1650 | 1650 |
| Transparency Ununiformity | (%) | 1 | — | — | — |
| Average Loss | (dB) | — | 0.07 | — | — |
| Loss Ununiformity | (dB) | — | 0.01 | — | — |
| Winding Hardness Variation | — | 2 | 3 | 5 | 6 |

|  |  | Example 13 | Example 14 | Example 15 | Example 16 |
|---|---|---|---|---|---|
| Resin A | Resin | PC | PC | PP | PET |
|  | Additive | — | — | — | PMP |
|  | Refractive Index | 1.59 | 1.59 | 1.48 | 1.59 |
| Resin B | Resin | PC | PC | PC | PET |
|  | Additive | PMP | PMP | — | PMP |
|  | Refractive Index | — | — | 1.59 | 1.59 |
| Difference Between Refractive Indices |  | — | — | 0.11 | — |
| B Layer | Average Cross-Sectional Width (μm) | 100 | 20 | 100 | 10000 |
|  | Accuracy of Cross-Sectional Width | C, D | A | B | C |
|  | Accuracy of Interval | C, D | A | A | A |
|  | Accuracy of Cross-Sectional Area | C | A | C | A |
|  | S1/S2 | C | C | C | A |
|  | Number of Layers | 3000 | 3000 | 600 | 13 |
|  | Shape of Cross-Section | Rectangle | Rectangle | Circle | Semicircle |
|  | Covered/Uncovered | Covered | Covered | Covered | Covered |
| Film Width | (mm) | 600 | 600 | 600 | 400 |
| Film Thickness | (μm) | 500 | 450 | 1000 | 1500 |
| Transparency Ununiformity | (%) | 2 | 0.5 | — | 5 |
| Average Loss | (dB) | — | — | 0.5 | — |
| Loss Ununiformity | (dB) | — | — | 0.02 | — |
| Winding Hardness Variation | — | 2 | 2 | 2 | 1 |

|  |  | Example 17 | Example 18 | Comparative Example 7 |
|---|---|---|---|---|
| Resin A | Resin | PET | PET | PP |
|  | Additive | PMP | PMP | — |
|  | Refractive Index | 1.59 | 1.59 | 1.48 |

TABLE 1-continued

| Resin B | Resin | PET | PCT/I | PC |
|---|---|---|---|---|
| | Additive | Ti | PMP | — |
| | Refractive Index | 1.59 | 1.56 | 1.59 |
| Difference Between Refractive Indices | | — | 0.03 | 0.11 |
| B Layer | Average Cross-Sectional Width (μm) | 10000 | 200 | — |
| | Accuracy of Cross-Sectional Width | C | A | C |
| | Accuracy of Interval | A | A | C |
| | Accuracy of Cross-Sectional Area | A | A | C |
| | S1/S2 | A | A | C |
| | Number of Layers | 13 | 1200 | — |
| | Shape of Cross-Section | Semi-circle | Semi-circle | — |
| | Covered/Uncovered | Covered | Covered | Uncovered |
| Film Width | (mm) | 400 | 400 | 600 |
| Film Thickness | (μm) | 1500 | 250 | 1000 |
| Transparency Ununiformity | (%) | 2 | 2 | — |
| Average Loss | (dB) | — | — | — |
| Loss Ununiformity | (dB) | — | — | Non-Measurable |
| Winding Hardness Variation | | — | 1 | 1 | 10 |

The present invention relates to a laminated film and a film roll thereof. A laminated film of the present invention is suitable for a light guide, a light collecting film, a light diffusion film, a viewing angle control film and an optical waveguide film. A laminated film of the present invention may be employed for an optical module, an illuminating device, a communication device, a display or the like.

The invention claimed is:

1. An extrusion die for laminating at least two kinds of resins in the width direction, said extrusion die comprising:
    not less than 10 nozzles arranged in the width direction;
    not less than 10 holes arranged in such a manner that said holes surround each of said arranged nozzles; and
    a junction which communicates with said arranged nozzles and said holes, said extrusion die comprising at least one flow path communicating with the junction in a different route from that between said nozzle and said hole,
    wherein the flow path are slit flow paths extending in the width direction,
    and the distance between the slit flow paths vary in the width direction.

2. The extrusion die according to claim 1, wherein said hole and/or said nozzle is/are asymmetric relative to the center axis in the thickness direction.

3. An extrusion die for laminating at least two kinds of resins in the width direction, wherein said extrusion die comprises:
    not less than 10 holes arranged in the width direction;
    a junction which communicates with said arranged holes; and
    at least one flow path communicating with said junction in a different route from that with said holes, wherein said holes are asymmetric relative to the center axis in the thickness direction of said hole,
    wherein the flow path are slit flow paths extending in the width direction,
    and the distance between the slit flow paths vary in the width direction.

* * * * *